United States Patent
Hoag et al.

(10) Patent No.: US 7,963,720 B2
(45) Date of Patent: Jun. 21, 2011

(54) POLYMER COATED NANOPARTICLE ACTIVATION OF OXIDANTS FOR REMEDIATION AND METHODS OF USE THEREOF

(75) Inventors: George E. Hoag, Bloomfield, CT (US); John B. Collins, Bloomfield, CT (US); Rajender S. Varma, Cincinnati, OH (US); Mallikarjuna N. Nadagouda, Cincinnati, OH (US)

(73) Assignees: VeruTEK, Inc., Bloomfield, CT (US); The United States of America as represented by the Administrator of the U.S. Enviromental Protection Agency, Washington, DC (US)

( * ) Notice: Subject to any disclaimer, the term of this patent is extended or adjusted under 35 U.S.C. 154(b) by 0 days.

(21) Appl. No.: 12/680,103

(22) PCT Filed: Sep. 26, 2008

(86) PCT No.: PCT/US2008/011235
§ 371 (c)(1),
(2), (4) Date: Mar. 25, 2010

(87) PCT Pub. No.: WO2009/042228
PCT Pub. Date: Apr. 2, 2009

(65) Prior Publication Data
US 2010/0232883 A1    Sep. 16, 2010

Related U.S. Application Data

(60) Provisional application No. 60/960,340, filed on Sep. 26, 2007.

(51) Int. Cl.
*B09C 1/08* (2006.01)

(52) U.S. Cl. .................. 405/128.75; 977/810; 977/903
(58) Field of Classification Search ............. 405/128.75; 977/810, 903
See application file for complete search history.

(56) References Cited

U.S. PATENT DOCUMENTS

| | | | |
|---|---|---|---|
| 3,640,821 | A | 2/1972 | Sweeny et al. |
| 3,938,590 | A | 2/1976 | Redford et al. |
| 4,068,717 | A | 1/1978 | Needham |
| 4,101,172 | A | 7/1978 | Rabbitts |
| 4,229,281 | A | 10/1980 | Alquist et al. |
| 4,321,147 | A | 3/1982 | McCoy et al. |

(Continued)

FOREIGN PATENT DOCUMENTS

EP    0706427 A1    4/1996

(Continued)

OTHER PUBLICATIONS

Adventus Group, Products: Overview for Accelerated Bioremediation Accessed Apr. 15, 2007, www.adventusgroup.com/products/technologies.shtml.

(Continued)

*Primary Examiner* — John Kreck
(74) *Attorney, Agent, or Firm* — Venable LLP; Michael A. Gollin; Lars H. Genieser

(57) ABSTRACT

Methods of decreasing the amount of one or more contaminants in contaminated soil comprise introducing polymer-coated nanoparticles into the contaminated soil, optionally with other reagents. The polymer-coated nanoparticles exhibit an enhanced ability to migrate through the soil and provide greater control of the rate of activation of other chemicals, such as oxidants, in the contaminated soil.

17 Claims, 8 Drawing Sheets

U.S. PATENT DOCUMENTS

| | | |
|---|---|---|
| 4,338,185 A | 7/1982 | Noelle |
| 4,353,806 A | 10/1982 | Canter et al. |
| 4,360,061 A | 11/1982 | Canter et al. |
| 4,368,111 A | 1/1983 | Siefkin et al. |
| 4,389,399 A | 6/1983 | Murdock |
| 4,405,015 A | 9/1983 | McCoy et al. |
| 4,470,899 A | 9/1984 | Miller et al. |
| 4,474,616 A | 10/1984 | Smith et al. |
| 4,968,412 A | 11/1990 | Guymon |
| 5,000,872 A | 3/1991 | Olah |
| 5,009,773 A | 4/1991 | Schramm et al. |
| 5,143,598 A | 9/1992 | Graham et al. |
| 5,286,141 A | 2/1994 | Vigneri |
| 5,319,966 A | 6/1994 | Jackson et al. |
| 5,340,467 A | 8/1994 | Gregoli et al. |
| 5,399,350 A | 3/1995 | Potter |
| 5,414,207 A | 5/1995 | Ritter |
| 5,484,549 A | 1/1996 | Hei et al. |
| 5,546,134 A | 8/1996 | Lee |
| 5,560,737 A | 10/1996 | Schuring et al. |
| 5,602,090 A | 2/1997 | Melikyan et al. |
| 5,622,641 A | 4/1997 | Kim et al. |
| 5,641,020 A | 6/1997 | Cherry et al. |
| 5,788,738 A | 8/1998 | Pirzada et al. |
| 5,829,691 A | 11/1998 | Gaudin |
| 5,846,434 A | 12/1998 | Seaman et al. |
| 5,849,201 A | 12/1998 | Bradley |
| 5,905,036 A | 5/1999 | Pope et al. |
| 5,919,487 A | 7/1999 | Simonnet et al. |
| 5,948,242 A | 9/1999 | Ohsol et al. |
| 5,968,249 A | 10/1999 | Duyvesteyn et al. |
| 6,003,206 A | 12/1999 | Hall et al. |
| 6,019,548 A | 2/2000 | Hoag et al. |
| 6,019,888 A | 2/2000 | Mishra et al. |
| 6,039,882 A | 3/2000 | Wolfe et al. |
| 6,099,206 A | 8/2000 | Pennell |
| 6,127,319 A | 10/2000 | House |
| 6,158,924 A | 12/2000 | Athens et al. |
| 6,242,663 B1 | 6/2001 | Ponder et al. |
| 6,261,463 B1 | 7/2001 | Jacob et al. |
| 6,261,986 B1 | 7/2001 | Bowman et al. |
| 6,274,048 B1 | 8/2001 | Parker et al. |
| 6,315,494 B1 | 11/2001 | Oberle |
| 6,321,595 B1 | 11/2001 | Pope et al. |
| 6,352,387 B1 | 3/2002 | Briggs et al. |
| 6,387,278 B1 | 5/2002 | Leif et al. |
| 6,474,908 B1 | 11/2002 | Hoag et al. |
| 6,511,954 B1 | 1/2003 | Wilbur et al. |
| 6,596,190 B1 | 7/2003 | Igawa et al. |
| 6,623,211 B2 | 9/2003 | Kukor et al. |
| 6,664,298 B1 | 12/2003 | Reinhart et al. |
| 6,689,485 B2 | 2/2004 | Ponder et al. |
| 6,719,902 B1 | 4/2004 | Alvarez et al. |
| 6,726,406 B2 | 4/2004 | Gilmore et al. |
| 6,777,449 B2 | 8/2004 | Vance et al. |
| 6,866,764 B2 | 3/2005 | Dalman et al. |
| 6,869,535 B2 | 3/2005 | Cowdery et al. |
| 6,881,490 B2 | 4/2005 | Kambe et al. |
| 6,881,709 B2 | 4/2005 | Nelson et al. |
| 6,913,419 B2 | 7/2005 | Shiau |
| 6,945,734 B1 | 9/2005 | Hayes et al. |
| 7,008,964 B2 | 3/2006 | Clausen et al. |
| 7,021,863 B2 | 4/2006 | Shiau |
| 7,037,946 B1 | 5/2006 | Reinhart et al. |
| 7,056,061 B2 | 6/2006 | Kukor et al. |
| 7,066,254 B2 | 6/2006 | Vinegar et al. |
| 7,128,841 B2 | 10/2006 | Zhang |
| 7,141,162 B2 | 11/2006 | Garner et al. |
| 7,175,717 B2 | 2/2007 | Song et al. |
| 7,186,673 B2 | 3/2007 | Varadaraj et al. |
| 7,192,092 B2 | 3/2007 | Watson |
| 7,226,966 B2 | 6/2007 | Kambe et al. |
| 7,229,950 B2 | 6/2007 | Shpakoff et al. |
| 7,301,066 B2 | 11/2007 | Vance et al. |
| 7,334,965 B2 | 2/2008 | Yang |
| 7,364,386 B2 | 4/2008 | Shiau |
| 7,431,775 B2 | 10/2008 | Wang et al. |
| RE40,734 E | 6/2009 | Borden et al. |
| 7,553,105 B1 | 6/2009 | Dugan et al. |
| 7,708,496 B2 | 5/2010 | Shiau |
| 2002/0011442 A1 | 1/2002 | McMurtrey et al. |
| 2002/0179530 A1 | 12/2002 | Cowdery et al. |
| 2003/0059926 A1 | 3/2003 | deTorres |
| 2003/0175081 A1 | 9/2003 | Shiau |
| 2004/0228690 A1 | 11/2004 | Stegemeier et al. |
| 2005/0077242 A1 | 4/2005 | Karlsson |
| 2005/0191131 A1 | 9/2005 | Shiau |
| 2005/0197267 A1 | 9/2005 | Zaki et al. |
| 2005/0199556 A1 | 9/2005 | Zhang |
| 2006/0046297 A1 | 3/2006 | Ball |
| 2006/0210815 A1 | 9/2006 | Furusawa et al. |
| 2006/0275757 A1 | 12/2006 | Lee et al. |
| 2007/0116524 A1 | 5/2007 | Shiau |
| 2007/0119786 A1 | 5/2007 | Schaefer et al. |
| 2007/0212562 A1 | 9/2007 | Shim et al. |
| 2007/0256713 A1 | 11/2007 | Feitz et al. |
| 2007/0256985 A1* | 11/2007 | Zhao et al. ............... 210/757 |
| 2008/0003687 A1 | 1/2008 | Satoh et al. |
| 2008/0047906 A1 | 2/2008 | Zhang |
| 2008/0190865 A1 | 8/2008 | Zhao et al. |
| 2008/0207981 A1 | 8/2008 | Hoag et al. |
| 2008/0237141 A1 | 10/2008 | Kerfoot |
| 2008/0264876 A1* | 10/2008 | Block et al. ............... 210/759 |
| 2009/0245939 A1 | 10/2009 | Burns et al. |
| 2009/0250404 A1 | 10/2009 | Berkowitz et al. |
| 2010/0209193 A1 | 8/2010 | Hoag et al. |
| 2010/0209194 A1 | 8/2010 | Guite et al. |

FOREIGN PATENT DOCUMENTS

| | | |
|---|---|---|
| EP | 1151807 A1 | 11/2001 |
| WO | WO-93/25714 A1 | 12/1993 |
| WO | WO-95/001232 A1 | 1/1995 |
| WO | WO-98/025857 A1 | 6/1998 |
| WO | WO-03/068324 | 8/2003 |
| WO | WO-03/101541 A1 | 12/2003 |
| WO | WO-2005/095031 A1 | 10/2005 |
| WO | WO-2009/042228 | 4/2006 |
| WO | WO-2006/055054 A1 | 5/2006 |
| WO | WO-2006/068354 A1 | 6/2006 |
| WO | WO-2007/047946 A2 | 4/2007 |
| WO | WO-2007/126779 A2 | 11/2007 |
| WO | WO-2009/014697 | 1/2009 |
| WO | WO-2009/042223 A2 | 4/2009 |
| WO | WO-2009/042224 A1 | 4/2009 |
| WO | WO-2009/140694 | 5/2009 |
| WO | WO-2009/114145 A2 | 9/2009 |

OTHER PUBLICATIONS

Adventus Group. Groundwater Solutions. Accessed Apr. 15, 2007, www.adventusgroup.com/solutions/groundwater.shtml.

Anastas PT, Warner JC. Green Chemistry: Theory and Practice, Oxford University Press, Inc: New York. 1998.

Arcadis. Perchlorate. www.arcadis-us.com.

Beal DR, Faircloth H, Tackling Tough Groundwater Contaminants: the presence of dense non-aqueous-phase liquids (DNAPLs) in the sub-surfaces requires some unconventional approaches to site investigation and remediation, Chemical Engineering, Mar. 2002, 91-94.

Bergendahl J, Thies T. Fenton's Oxidation of MTBE with Zero-valent Iron. 2004. Water Research. 38:327-334.

Block, PA, Brown RA, Robinson, D. Novel activation technologies for sodium persulfate in situ chemical oxidation. Proceedings of the Fourth International Conference on the Remediation of Chlorinated and Recalcitrant Compounds, Monterey, CA, May 2004. Batelle Press, Columbus, OH. 2004.

Blum YD, Kambe N, Chaloner-Gill B, Chiruvolu S, Kumar S, MacQueen DB. Nanocomposites by Covalent Bonding between Inorganic Nanoparticles and Polymers. Materials Research Society Symposium Proceedings 2001, 676: 1.8.1.

Boussahel R, Hark D, Mammar M, Lanara-Mohamed S. Degradation of Obsolete DDT by Fenton Oxidation with Zero-Valent Iron., Desalination 2007, 206: 369-372. Presented at the EuroMed 2006 Conference on Desalination Strategies in South Mediterranean Countries, Montpellier, France May 21-25, 2006.

Carvel DD, Cartwright RT Innovative heavy oil contaminant remediation at typical MGP remediation sites. 2005. Unpublished data from web sites: http://www.mecx.net/services1.html.

Chang M, Shu H, Yu H. An Integrated technique using Zero Valent Iron and UV/H202 Sequential Process form Complete Decolorization and Mineralization of C.I. Acid Black 24 Wastewater. Journal of Hazardous Materials 2006, B 138: 574-581.

Chen J, McLellan JM, Siekkinen AY, Xiong Y, Li ZY, Xia Y. Facile synthesisof gold-silver nanocages with controllable pores on the surface. J. Am. Chem. Soc. 2006, 128: 14776.

Choi CW, Kin SC, Hwang SS, Choi BK, Ahn HJ, Lee MY, Park SH, Kim SK. Antioxidant activity and free radical scavenging capacity between Korean medicinal plants and flavonoid by assay-guided comparison. Plant Science 2002, 16: 1161-1168.

Chun H, Scriven LE. Hydrodynamic model of steady movement of a solid/liquid/fluid contact line. J. Colloid Interface Sci. 1971, 35: 85-101.

Collins, John and Hoag, George. Coelution Technologies and Surfactant-Enhanced in Situ Oxidation as new breakthrough technologies in the treatmen of toxic subsurface contaminants. 11th Annual Green Chemistry and Engineering Conference. 2007. Retrieved Mar. 25, 2009. http://acs.confex.com/acs/green07/techprogram/P42826.htm.

Coutteneye RA, Huang KC, Hoag GE, Suib SL. Evidence of Sulfate Free Radical (SO4-") Formation under Heat-assisted Persulfate Oxidation of MTBE. Proceedings of the 19th Petroleum Hydrocarbons and Organic Chemicals in Ground Water: Prevention, Assessment, and Remediation, Conference and Exposition, Atlanta, GA, United States, Nov. 5-8, 2002, 345-350.

Dahl JA, Maddux LS, Hutchison JE, Toward Greener Nanosynthesis, Chem. Rev. 2007, 107:2228.

Das, SK, Butler, R M. Mechanism of the Vapor Extraction Process for Heavy Oil and Bitumen. J Petroleum Sci. and Eng. 1998. 21: 43-59.

Diallo et al. Solubilization of nonaqueous phase liquid hydrocarbons in micellar solution of dodecyl alcohol ethoxylates . Environ. Sci. Technol. 1994. 1829-1837.

Du J, Han B, Liu Z, Liu Y, Kang DJ. Control Synthesis of Silver Nanosheets, Chainlike Sheets, and Microwires via a Simple Solvent-Thermal Method. Crystal Growth and Design 2007, 7:900.

Edwards, DA, Luthy, RG, Lly, Z. Solubilization of Polycyclic Hydrocarbons in Micellar Nonionic Surfactant Solutions. 1991 Environ. Sci. Technol. 25:127-133.

EOS Remediation Inc. Emulsified Edible Oils for Anaerobic Bioremediation. Accessed Apr. 15, 2007, www.eosremediation.com.

Falta RW. Using Phase Diagrams to Predict the Performance of Cosolvent Floods for NAPL Remediation. Ground Water Monit. Rem. 1998, 18(3): 227-232.

Fang J, You H, Kong P, Yi Y, Song X, Ding B. Dendritic Silver Nanostructure Growth and Evolution in Replacement Reaction. Crystal Growth and Design 2007, 7: 864.

Flaming JE, Knox RC, Sabatini DA, Kibbey TC, Surfactant Effects on Residual Water and Oil Saturations in Porous Media. 2003, Vadose Zone Journal 2:168-176.

Florida Chemical Company, Material Safety Data Sheet for Citrus Burst 3. Jul. 2007, Winter Haven, FL.

Frankel AJ, Owsianiak, LM, Wuerl, BJ, Horst, JF. In-Situ Anaerobic Remediation of Perchlorate-Impacted Soils. Arcadis US.

Georgetti Sr, Casagrande R, Di Mambro, VM, Azzolini, AECS, Fonseca, MJV. Evaluation of the Antioxidant of Different Flavonoids by the Chemiluminescence Method. AAPA PharmSci. 2003. 5(2) Article 20.

Gillham RW, O'Hannesin SF. Enhanced degradation of halogenated aliphatics by zero-valent iron. Ground Water 1994, 32(6): 959-967.

Goi et al. Combined chemcial and biological treatment of oil contaminated soil. Chemosphere. Pergamon Press. Oxford. GB. 2006. vol. 63:10. 1754-1763.

Guha S, Jaffe PR. Biodegradation kinetics of phenanthrene partitioned into the micellar phase of nonionic surfactants. Env. Sci. & Tech. 1996, 30: 605-611.

Hatano T, Kagawa H, Yasuhara T, Okuda T. Two new flavonoids and other constituents in licorice root: their relative astringency and radical scavenging effect. Chem. Phar. Bull. 1998, 36: 2090-2097.

He F, Zhao D. Preparation and characterization of a new class of starch-stabilized bimetallic nanoparticles for degradation of chlorinated hydrocarbons in water. Environ Sci Technol. 2005, 39: 3314-3320.

House DA, Kinetics and Mechanism of Oxidations by Peroxydisulfate, Chemistry Review 1962, 62: 185-200.

Huang K, Couttenye RA, Hoag G. Kinetics of heat-assisted persulfate exidation of methyl tertbutyl ether (MTBE). Chemosphere 2002, 49(4), 413-420.

International Search Report and the Written Opinion of the International Searching Authority for PCT/US2007/007517, Nov. 27, 2008.

International Search Report and Written Opinion for PCT/US08/011228 mailed May 28, 2009.

International Search Report and Written Opinion issued in International Application No. PCT/US2008/011235, mailed on Dec. 19, 2008.

International Search Report and Written Opinion issued in International Application No. PCT/US2008/11229, mailed on Dec. 9, 2008.

International Search Report and Written Opinon for PCT/US2008/008905 mailed May 7, 2009.

International Search Report for International Application No. PCT/US2009/044402, mailed Apr. 12, 2010.

Interstate Technology & Regulatory Council Dense Nonaqueous Phase Liquids Team, Technical and Regulatory Guidance for Surfactant/Cosolvent Flushing of DNAPL Source Zones, Apr. 2003.

Jafvert CT, Technology Evaluation Report: Surfactants/Cosolvents. Dec. 1996, GoundWter Remediation Analysis Center, Pittsburgh, PA.

Jawitz, JW, Annable, MD, Rao, PSC, Rhue, RD. Field Implementation of a Winsor Type 1 Surfactant. Alcohol Mixture for in Situ Solubilization of a Complex LNAPL as a Single-Phase Microemulsion. 1998. Environ. Sci. Technol., 32:523-530.

Juliano LM, Griffiths RR. A critical review of caffeine withdrawal: empirical validation of symptoms and signs, incidence, severity, and associated features. Psychopharmacology 2004, 176, 1.

Kile, DE, Chiou, CT. Water Solubility Enhancements of DDT and Trichlorobenzene by Some Surfactants Below and Above the Critical Micelle Concentration. Environ. Sci. Technol. 1989, 23:832-838.

Kislenko VN, Berlin AA, Litovchenko NV, Kinetics of Oxidation of Glucose by Persulfate Ions in the Presence of Mn (II) Ions, Kinetics and Catalysis 1997, 38(3): 391-396.

Kolthoff IM, Medalia AI, Raaen HP, The Reaction Between Ferrous Iron and Peroxides IV Reaction with Potassium Sulfate, Journal of American Chemical Society 1951, 73: 1733-1739.

Kotterman MJ, Rietberg HJ, Hage A, Field JA. Polycyclic aromatic hydrocarbon oxidation by white-rot fungus Bjerkandera sp. Strain BOS55 in the presence of non-ionic surfactants. Biotechnology and Bioengineering 1997, 57: 220-227.

Kumar A, Vemula PK, Ajayan PM, John G., Silver Nanoparticle-Embedded Antimicrobial Paints Based on Vegetable Oil, Nature Materials 2008, 7: 236-241.

Li Zhaohui, Surfactant-enhanced oxidation of trichloroethylene by permanganate- proof of concept. Chemosphere 2004, 54:419-423.

Liang CJ, Bruell CH, Marley MC, Sperry, KL. Thermally activated persulfate oxidation of trichloroethylene (TCE) and 1,1,1-trichloroethane (TCA) in aqueous systems and soil slurries. 2003. Soil & Sediment Contamination 2003, 12(2): 207-228.

Liang CJ, Bruell, CJ, Marley MC, Sperry KL. Persulfate oxidation for in situ remediation of TCE II: Activated by chelated ferrous ion. Chemosphere 2004, 55(9), 1225-1233.

Luong HV, Lin HK. Controlling Fenton reaction for soil remediation. Analytical Letters 2000, 33(14), 3051-3065.

Martel R, Gelinas P. Surfactant solutions developed for NAPL recovery in contaminated aquifers. Ground Water 1996, 34: 143-154.

Martel R, Gelinas PJ, Desnoyers JE, Masson A. Phase Diagrams to Optimize Surfactant Solutions for Oil and DNAPL Recovery in Aquifers, Ground Water 1993, 31: 789-800.

Moschopedis SE. et al. Surface-active materials from Athabasca oil sands. Fuel processing Technology 1980, 3: 55-61.

Murphy CJ, Gole AM, Hunyadi SE, Orendorff CJ. One-Dimensional Colloidal Gold and Silver Nanostructures. Inorg Chem 2006, 45(19): 7544-7554.

Nadagouda et al., "Green Synthesis of Au Nanostructures at Room Temperature Using Biodegradable Plant Surfactants," Crystal Growth and Design, vol. 9, No. 11, 2009.

Nadagouda MN, Varma RS. A Greener Synthesis of Core (Fe, Cu)-Shell (Au, Pt, Pd and Ag) Nanocrystals Using Aqueous Vitamin C, Crystal Growth and Design 2007, 7(12): 2582-2587.

Nadagouda MN, Varma RS. Green and Controlled Synthesis of Gold and Platinum Nanomaterials Using Vitamin B2: Density-Assisted Self Assembly of Nanospheres, Wires and Rods, Green Chem. 2006, 8: 516.

Nadagouda MN, Varma RS. Green Chem. 2007, 9: 632.

Nadagouda MN, Varma RS. Green synthesis of silver and palladium nanoparticles at room temperature using coffee and tea extract. Royal Society of Chemistry. Green Chem 2008, 10: 859-862.

Nadagouda MN, Varma RS. Microwave Assisted Shape Controlled Bulk Synthesis of Ag and Fe Nanorods in Poly(ethylene glycol) Solutions, Crystal Growth and Design 2008, 8(1): 291-295.

Nadagouda MN, Varma RS. Microwave Assisted Shape Controlled Bulk Synthesis of Noble Nanocrystals and Their Catalytic Properties, Crystal Growth and Design 2007, 7(4): 686-690.

Nadagouda MN, Varma RS. Preparation of novel metallic and bimetallic cross-linked poly(vinyl alcohol) nanocomposites under microwave irradiation. Macromolecular Rapid Communications 2007, 28: 465-472.

Nadagouda MN, Varma RS. Synthesis of Thermally stable carboyxmethyl cellulose/metal biodegradable nanocomposites for potential biological application. Biomacromolecules 2007, 8(9):2762-2767.

Naik RR, Stringer SJ, Agarwal G, Jones SE, Stone MO. Nature Mater. 2002, 1: 169.

Narayan A, Landstrom L, Boman M. Laser-assisted synthesis of ultra small metal nanoparticles. Appl. Surf Sci 2003, 137: 208.

Niu S-F, Liu Y, Xu X-H, Lou Z-H. Removal of hexavalent chromium from aqueous solution by iron Nanoparticles. J. Zhejiang Univ Sci B 2005, 6(10): 1022-1027.

Office Action for U.S. Appl. No. 12/068,653, mailed May, 26, 2010.

Office Action in U.S. Appl. No. 12/771,210 mailed on Aug. 20, 2010.

Office Action issued by the USPTO for U.S. Appl No. 12/667,384 on Jul. 7, 2010.

Office Action issued by the USPTO for U.S. Appl. No. 12/667,478 on Jul. 9, 2010.

Peters, S.M. et al. A Laboratory Study on the Degradation of Gasoline Contamination Using Fenton's Reagent, Proceedings 54th Canadian Geotechnical Conference, 2001 An Earth Odyssey, p. 1170-1177.

Pirkanniemi K, Sillanpaa M, Sorokin A. Degradative Science of the Total Environment 2003, 307: 1-3, 11-18.

Ponder S, Darab JG, Bucher J, Caulder D, Craig I, Davis L, Edelstein N, Lukens W, Nitsche H, Rao L, Shuh DK, Mallouk TE. Surface chemistry and electrochemistry of supported zerovalent iron nanoparticles in the remediation of aqueous metal contaminants. Chem. Mater. 2001, 13(2): 479-486.

Ponder SM, Darab JG, Mallouk TE. Remediation of Cr(VI) and Pb(II) aqueous solutions using supported, nanoscale zero-valent iron. Environ. Sci. Technol. 2000, 34: 2564-2569.

Powell RM, Puls RW, Hightower SS, Sabatini DA. Coupled Iron Corrosion and Chromate Reduction: Mechanisms for Subsurface Remediation. Environ. Sci. Technol. 1995, 29: 1913-1922.

Raveendran P, Fu J, Wallen SL. Completely "Green" Synthesis and Stabilization of Metal Nanoparticles, J. Am. Chem. Soc. 2003, 125: 13940.

Regenesis. Chemical Oxidation. Accessed Apr. 15, 2007, www.regenesis.com/products/chemOx/.

Regenesis. Enhanced Aerobic Bioremediation, Accessed Apr. 15,2007, www.regenesis.com/products/enhAer/.

Regenesis. Remediation Products. Accessed Apr. 15,2007, www.regenesis.com.

Roote, Diane S. Technology Status Report in Situ Flushing: Ground-Water Remediation Technologies Analysis Center, Pittsburg, PA, Nov. 1998.

Schramm et al. The Influence of Interfacial tension in the recovery of bitumen by water-based conditioning and flotation of Athabasca oil sands. Fuel Processing Technology 2003, 80: 101-118.

Schrick B, Blough J, Jones A, Mallouk TE. Hydrodechlorination of trichloroethylene to hydrocarbons using bimetallic nickel-iron nanoparticles. Chem. Mater. 2002, 14(12): 5140-5147.

Shankar, S. et al. Controlling the Optical properties of Lemongrass Extract Synthesized gold Nanotriangles and Potential Application in Infrared-absorbing Optical Coatings Chemistry of Materials 20050208 American Chemical Society US, vol 1. 17, No. 3, 2005, pp. 566-572.

Shiau BJ, Sabatini DA, Harwell JH. Solubilization and mobilization of DNAPLs using direct food additive (edible) surfactants. Ground Water 1994, 32: 561-569.

Song H, Rioux RM, Hoefelmeyer JD, Komor R, Niesz K, Grass M, Yang P, Somorjai GA. Hydrothermal Growth of Mesoporous SBA-15 Silica in the Presence of PVP-Stabilized Pt Nanoparticles: Synthesis, Characterization, and Catalytic Properties J. Am. Chem. Soc. 2006, 128: 3027.

Song, Jae Yong, et al. Rapid Biological Synthesis of Silver Nanoparticles Using Plant Leat Extracts. Bioprocess and Biosytems Engineering, vol. 32, No. 1, 2008 (Apr. 26, 2008), pp. 79-84.

Stone JW, Sisco PN, Goldsmith EC, Baxter SC, Murphy CJ. Using gold nanorods to probe cell-induced collagen deformation. Nano Letters 2007, 7: 116.

Sun Y, Xia Y. Shape-Controlled Synthesis of Gold and Silver Nanoparticles. Science 2002, 298: 2176.

Sundstrom DW, Allen JS, Fenton SS, Salimi FE, Walsh KJ, Treatment of Chelated Iron and Copper Wastes by Chemical Oxidation, J Environ Sci Health 1996, A31: 1215.

Swe, MM, Yu, LE, Hung, KC, Chen, BH. Solubilization of Selected Polycyclic Aromatic Compounds by Nonionic Surfactants. Journal of Surfactants and Detergents. 2006, 9:3, 237-244.

Sweeny, KH. 1981 a. The Reductive Treatment of Industrial Wastewater: II. Process Applications. American Institute of Chemical Engineers, Symposium Series, Water-1980 Fd. G.F. Nennett. 209(77): 67-71.

Sweeny, KH. 1981 b. The Reductive Treatment of Industrial Wastewater: I. Process Description. American Institute of Chemical Engineers, Symposium Series, Water-1980 Ed. GF Nennett, 209(77): 72-78.

Tetrachloroethylene. Accessed Nov. 19, 2010. http://en.wikipedia.org/w/index.php?title=Tetrachloroethylene&printable=yes.

USDA 2007. Oxygen Radical Absorbance Capacity (ORAC) of Selected Foods-2007. Nutrient Data Laboratory, Beltsville Human Nutrition Research Center, Agricultural Research Service.

Uyeda R. Studies of Ultrafine Particles in Japan: Crystallography, Methods of Preparation and Technological Applications. Prog. Mater. Sci. 1991, 35: 1.

Wang C-B, Zhang W. Synthesizing nanoscale iron particles for rapid and complete dechlorination of TCE and PCBs. Environ. Sci. Technol. 1997, 31(7): 2154-2156.

Wang CC, Chen DH, Huang TC, Synthesis of palladium nanaparticles in water-in-oil microemulsions. Colloids ad Surfaces A: Physicochemical and Engineering Aspects 2001, 189: 145.

Wang X, Li Y. Monodisperse nanocrystals: general synthesis, assembly, and their applications. Chem Commun Camb 2007, 28: 2901-2910.

Wei JJ, Xu XH, Liu Y. Kinetics and mechanism of dechlorination of o-chlorophenol by nanoscale. Pd/Fe. Chem Res Chinese U. 2004;20:73-76.

Wiley B, Herricks T, Sun Y, Xia Y. Polyol synthesis of silver nanoparticles: Use of chloride and oxygen to promote the formation of single-crystal, truncated cubes & tetrahedrons. Nano Letters 2004, 4: 1733-1739.

Wiley B, Sun Y, Xia Y. Synthesis of silver nanostructures with controlled shapes and properties. Acc. Chem. Res 2007. 40: 1067.

Wiley BJ, Chen Y, McLellan JM, Xiong Y, Li Z-Y, Ginger D, Xia Y. Synthesis and Optical Properties of Silver Nanobars. Nano Letters 2007, 4: 1032.

Wu X, Beecher GR, Holden JM, Haytowitz DB, Gebhardt SE, Prior RL. Lipophilic and hydrophilic antioxidant capacities of common foods in the United States. Journal of Agricultural and Food Chemistry 2004, 52: 4026-4037.

Xiong Y, Cai H, Wiley BJ, Wang J, Kim MJ, Xia Y. Synthesis and Mechanistic Study of Palladium Nanobars and Nanorods. J. Am. Chem. Soc. 2007, 129: 3665.

Xu Y, Zhang W. Subcolloidal Fe/Ag particles for reductive dehalogenation of chlorinated benzenes. Ind. Eng. Chem. Res. 2000, 39(7): 2238-2244.

Yen GC, Chen F. Antioxidant activity of various tea extracts in relation to their antimutagenicity. Journal of Agricultural and Food Chemistry 1995, 45: 27-32.

Yeom IT, Ghosh MM. Mass transfer limitation in PAH-contaminated soil remediation. Water Sci. Tech 1998, 37: 111-118.

Zeveloff J, Inventor Sues Soil Remediation Co. Over Patents. Portfolio Media. Inc., Oct. 2008, New York NY.

Zhang H, Jin Z-H, Han L, Qin C-H. Synthesis of nanoscale zero-valent iron supported on exfoliated graphite for removal of nitrate. Transactions of Nonferrous Metals Society of China 2006, 16(1): s345-s349.

Zhang W, Wang C, Lien H. Treatment of chlorinated organic contaminants with nanoscale bimetallic particles. Catal. Today 1998, 40(4): 387-395.

Zhang W-X. Nanoscale iron particles for environmental remediation: An overview. J. Nanoparticle Research 2003, 5: 323-332.

Zheng Z, Obbard JP. Polycyclic Aromatic Hydrocarbon Removal from Soil by Surfactant Solubilization and Phanerochaete chrysosporium Oxidation. J. Environ. Qual. 2002, 31: 1842-1847.

Office Action issued by the USPTO for U.S. Appl. No. 12/667,384 on Jan. 19, 2011.

* cited by examiner

US 7,963,720 B2

POLYMER COATED NANOPARTICLE ACTIVATION OF OXIDANTS FOR REMEDIATION AND METHODS OF USE THEREOF

This application is a National Stage of International Application Number PCT/US2008/011235, filed Sep. 26, 2008, which claims the benefit of U.S. Provisional Application No. 60/960,340, filed Sep. 26, 2007, the entire contents of which are hereby incorporated in their entirety.

FIELD OF THE INVENTION

This invention relates to methods of decreasing the amount of one or more contaminants in contaminated soil comprising introducing polymer-coated nanoparticles into the contaminated soil, optionally with other reagents. The polymer-coated nanoparticles exhibit an enhanced ability to migrate through the soil and provide greater control of the rate of activation of other chemicals, such as oxidants, in the contaminated soil.

BACKGROUND OF THE INVENTION

Persulfate is emerging as a cost-effective and viable oxidant for in situ chemical oxidation (ISCO) technology for the treatment of organic contaminants in groundwater, soils, and sediments. In situ soil and/or groundwater remediation typically involves injecting substances such as oxidants into the soil or groundwater to locations proximate to the contaminants or chemicals of concern (COC). The injected substances react with the contaminants or COCs in situ to eliminate them, to break them down into less harmful substances, and/or to otherwise neutralize them. One type of in situ remediation is referred to as surfactant enhanced in situ chemical oxidation (S-ISCO) remediation, disclosed in International Application No. PCT/US2007/007517, filed on Mar. 27, 2007, the entire contents of which are hereby incorporated by reference.

In comparison with permanganate, persulfate chemistry brings about a greater decrease in the soil oxidant demand (SOD) and also promotes the formation of free radicals (sulfate free radical $SO_4^-$ and hydroxyl free radical $OH^-$), possibly ferryl ($FeO^{2+}$)-EDTA complex, a number of free radicals of the contaminants during their oxidation and a family of free radicals known to exist associated with the hydroxyl radical induced chain reactions. In contrast, permanganate does not have a free radical pathway. Because of its relatively high stability under normal subsurface conditions, persulfate travels through the subsurface into targeted contaminant zones more effectively than does hydrogen peroxide associated with Fenton's Reagent and Modified Fenton's Chemistry. While direct oxidation of many organic chemicals in the subsurface by persulfate is possible by direct oxidation pathways alone, the greatest potential for persulfate is realized when it is activated to form free radical species.

The formation of free radical species in the subsurface from persulfate requires both persulfate and an activator to be present in the zone desired for treatment. Ideally, injected persulfate and activator solutions would be able to migrate substantial distances through the subsurface, providing a continuous and sustained level of free radical production throughout the contaminated location targeted for treatment.

Heat activation of persulfate in the subsurface has limited application because of the significant thermal energy required to evenly heat the subsurface. A classical Fenton-like $Fe^{2+}$ activation of persulfate requires acidification of the subsurface, which in most cases is impractical, infeasible or undesirable because of the potential mobilization of heavy metals at low pH values and cost. $Fe^{2+}$ activation of persulfate in acidic solutions promotes rapid production of free radicals followed by stalling of the activation due to oxidation of $Fe^{2+}$ to $Fe^{3+}$. Iron chelates have been used to slow the activation of persulfate, in order to increase the longevity of divalent metal cations and to provide a more sustained activation of persulfate. The sustained persulfate activation obtained using either Fe(II) or Fe(III) chelated with ethylenediaminetetraacetic acid (EDTA), diethylenetriaminepentaacetic acid (DTPA), L-ethylenediaminedisuccinic acid (EDDS), and nitrilotriacetic acid (NTA) results from progressive oxidation of the chelate. Once the chelate species is oxidized or penetrated by persulfate, its chelating capacity is reduced and the iron cation is available to activate persulfate.

From a practical standpoint, oxidation of the chelating ligand in persulfate systems is viewed as advantageous, as the destruction of the ligand may alleviate concerns about the introduction of another component into the subsurface environment and the potential for heavy metal mobility in the subsurface. The oxidation rates of chelates varies depending upon the chelate used and the pH of the system. The use of metal chelates to activate persulfate can potentially be applied in situations where in situ chemical oxidation is needed. However, a limitation of the iron chelates disclosed in the prior art is that most chelates are oxidized by persulfate and its free radical species resulting in limited transport in the subsurface. As a consequence, persulfate generally has a much longer life in the subsurface than iron chelates. Therefore, the distance that an iron chelate travels in the subsurface is generally much shorter than that for persulfate. This requires additional injection wells for the iron chelate and may result in persulfate that is not activated and therefore not able to degrade contaminants targeted for treatment. Further, it has been demonstrated that iron chelate activated persulfate is not as effective in destroying certain classes of contaminants, such as chloroethanes. When activation is required, such as in the case of persulfate and peroxide, the longevity of the activator should ideally be close to that of the oxidant. One factor that may limit the ability of iron-chelate activators to travel as far in the subsurface as persulfate is that iron-chelate complexes can be degraded rapidly by persulfate.

Recently, zero-valent iron (ZVI) has been used to activate hydrogen peroxide for pentachlorophenol (PCP) and methyl-tertiary-butyl ether (MTBE) destruction. The use of powdered ZVI to activate hydrogen peroxide has been shown to increase the rate and extent of compound destruction. Unfortunately, the very rapid reaction rates of ZVI and the rapid oxidation of ZVI with hydrogen peroxide limits the applicability of this technology in subsurface applications.

In addition, the development of nano-scale ZVI processes for injection into the subsurface has also gained great attention in the art recently. To date, nano-scale ZVI has been injected in an aqueous slurry, mixed with an organic guar material to provide structural integrity for emplacement into fractures or permeable reactive barriers (PRBs), or mixed with molasses or another type of biodegradable substrate to promote simultaneous physical, chemical and/or biological reduction processes. When organic guar is used with ZVI, typically an enzyme is added once the guar-ZVI has been emplaced to induce biodegradation of the guar, thus exposing the ZVI to contaminated groundwater.

SUMMARY OF THE INVENTION

In some embodiments, the present invention provides methods for decreasing the amount of one or more contaminants in contaminated soil. These methods can comprise obtaining polymer-coated nanoparticles comprising a biodegradable polymer coating, and introducing the polymer-coated nanoparticles into the contaminated soil in an amount effective to decrease the amount of one or more contaminants in the soil. The method can also comprise introducing an oxidant into the contaminated soil in such a way that the nanoparticles activate the oxidant. In some embodiments, the oxidant is persulfate. Activation of the persulfate can result in the creation of sulfate free radicals. In some embodiments, the activated oxidant oxidizes one or more contaminants in the contaminated soil, thereby decreasing the amount of the contaminant or contaminants. The polymer-coated nanoparticles can comprise zero-valent iron. The biodegradable polymer can be, without limitation, xanthan polysaccharide, polyglucomannan polysaccharide, emulsan, an alginate biopolymer, hydroxypropyl methylcellulose, carboxy-methyl cellulose, ethyl cellulose, chitin, chitosan, polyvinyl alcohol, polyvinyl esters, polyvinyl amides, copolymers of polylactic acid, and combinations thereof.

The polymer-coated nanoparticles can be prepared by combining an aqueous solution of carboxymethyl cellulose with nanoparticles and a plant extract to form a mixture. Preparing the polymer-coated nanoparticles can occur in situ, in batch form, or in continuous preparation.

In another aspect, the polymer-coated nanoparticles create a reducing environment in the contaminated soil. The reducing environment can promote the growth and metabolism of anaerobic microorganisms, and wherein the anaerobic microorganisms decrease the amount of one or more contaminants present in the contaminated soil. In another aspect, the polymer-coated nanoparticles react with one or more substances in the contaminated soil to produce hydrogen gas, thereby removing a contaminant present in the contaminated soil. In some embodiments, acid is itself the contaminant to be removed. In some embodiments, the hydrogen gas produced in the reaction then reacts with other chemicals in the contaminated soil, thereby removing one or more contaminants.

In some embodiments, the biodegradable polymer composition degrades over time in the contaminated soil, thereby exposing the nanoparticles to other chemicals present in the contaminated soil. Once exposed, the nanoparticles can react with an oxidant that has been introduced into the contaminated soil, or create a reducing environment in the contaminated soil, or react with one or more substances in the contaminated soil to produce hydrogen gas.

In another aspect, the invention provides methods for decreasing the amount of one or more contaminants in contaminated soil, comprising obtaining polymer-coated nanoparticles comprising a polymer coating; obtaining an oxidant; and introducing the polymer-coated nanoparticles and the oxidant into the contaminated soil in amounts effective to decrease the amount of one or more contaminants in the soil. The nanoparticles can react with the oxidant in such a way as to activate the oxidant. The oxidant can be, for example, persulfate, and activation of the persulfate can comprise creation of sulfate free radicals. The activated oxidant can then oxidize one or more contaminants in the contaminated soil, thereby decreasing the amount of the contaminant or contaminants. The polymer-coated nanoparticles can also create a reducing environment in the contaminated soil. The polymer-coated nanoparticles can also react with one or more substances in the contaminated soil to produce hydrogen gas.

In some embodiments, the polymer coating comprises polymethyl methacrylate, polystyrene, polyethylene glycol, polyurethane, and combinations thereof. The polymer coating can comprise pores which permit the nanoparticles to interact with the other chemicals present in the contaminated soil.

In some embodiments, the polymer-coated nanoparticles remain able to activate an oxidant in a location in need of remediation for at least as long as an oxidant capable of oxidizing contaminant remains in the location, and the nanoparticles are able to travel as far through the location as does the oxidant. In some embodiments, the polymer coating can comprise partitioning polymers, or surfactant materials. The polymer coating can be capable of conducting an electric current. The polymer coating may also be hydrophobic, insoluble in water, and/or insoluble in oil. The polymer coating may be permeable to an atomic or molecular species selected from the group consisting of persulfate, sulfate, peroxide, hydroperoxide, oxygen, and hydroxyl ion and hydroxyl radical. In another aspect, the polymer coating degrades over the duration of a remediation process.

The polymer coating can have the form of a substantially spherical shell. The contaminated soil can contain contaminants comprising a non-aqueous phase liquid, and in some embodiments, the polymer coated nanoparticles can partition into the non-aqueous phase liquid.

In some embodiments, the polymer-coated nanoparticles are in an emulsion. The emulsion can comprise a surfactant.

In still another aspect, the present invention provides methods of using polymer-coated nanoparticles to treat a soil comprising a contaminant, comprising emulsifying the nanoparticles with an emulsifier selected from the group consisting of a surfactant, a cosolvent, and a mixture of a surfactant and a cosolvent, to form an emulsified treatment component; blending a plant product selected from the group consisting of a plant oil, a plant extract, and a combination of a plant oil and a plant extract, to form a blended treatment component; and introducing the emulsified treatment component and the blended treatment component into a subsurface of the soil or spreading the emulsified treatment component and the blended treatment component on the surface of the soil to create a reduction zone. In some embodiments, the emulsified treatment component and the blended treatment component are simultaneously injected into the subsurface or simultaneously spread on the surface of the soil.

In yet another aspect, the invention provides methods for extending the useful life of a permeable reactive barrier, comprising the steps of including in the barrier non-coated nanoparticles for activating an oxidant; including in the barrier polymer-coated nanoparticles for activating an oxidant; applying to the permeable reactive barrier a removing agent, thereby removing the polymer coating from the polymer-coated nanoparticles at the end of the useful life of the non-coated nanoparticles, thereby extending the useful life of the permeable reactive barrier.

DETAILED DESCRIPTION

Figure 1:
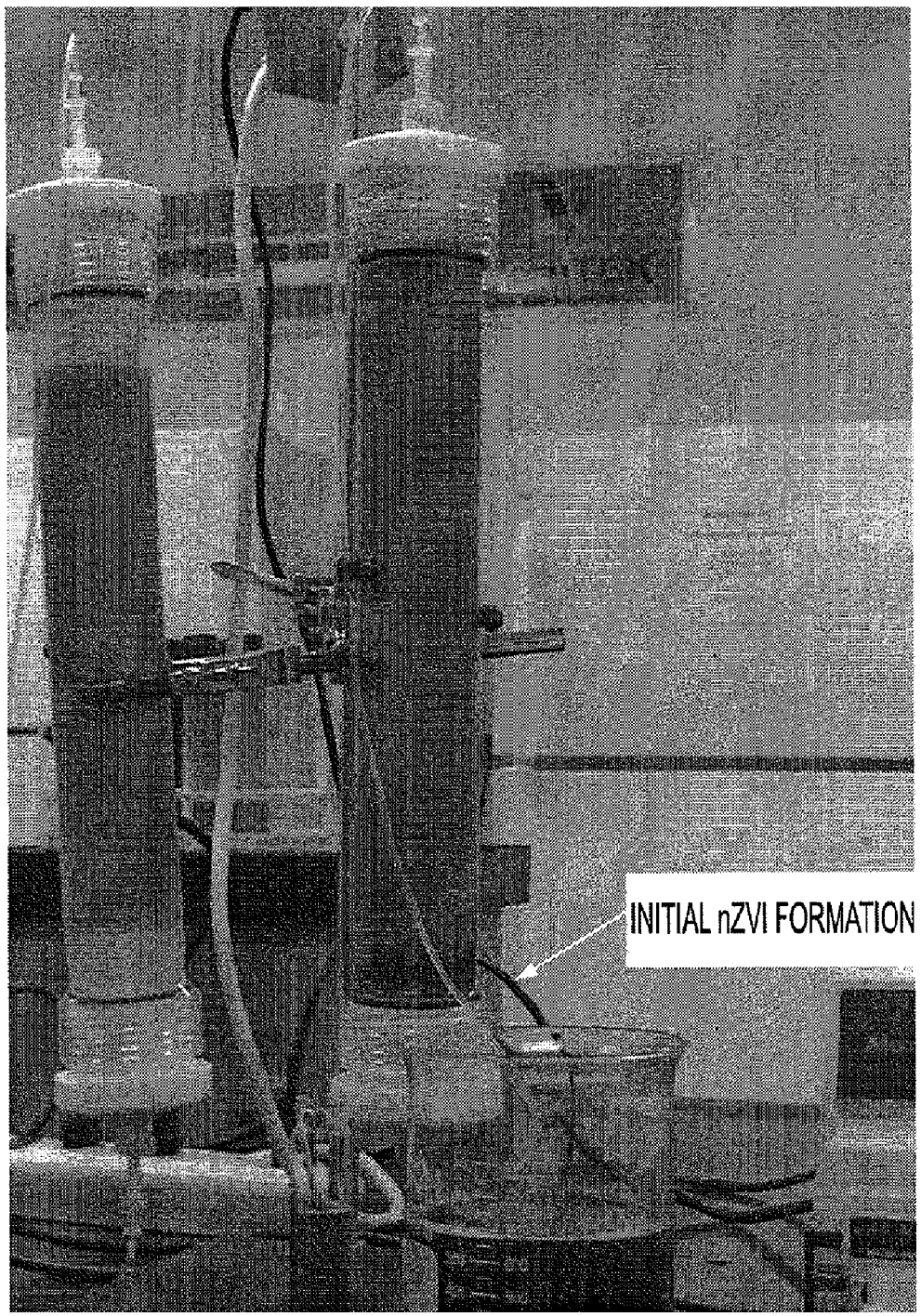
FIG. 1 presents a photograph of two soil columns that illustrate the initial formation of nanoscale zero valent iron in soil Column 1 Lemon Balm Extract with $Fe(NO_3)_3$.

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without parting from the spirit and scope of the invention. All references cited herein are incorporated by reference as if each had been individually incorporated.

"Contaminants" encompasses any substance present in a location that, by its presence, diminishes the usefulness of the location for productive activity or natural resources, or would diminish such usefulness if present in greater amounts or if left in the location for a length of time. The location may be subsurface, on land, in or under the sea or in the air. As used herein, "contaminated soil" encompasses any soil that contains at least one contaminant according to the present invention. "Contaminant" thus can encompass trace amounts or quantities of such a substance. Examples of productive activities include, without limitation, recreation; residential use; industrial use; habitation by animal, plant or other life form, including humans; and similar such activities. Examples of natural resources are aquifers, wetlands, sediments, soils, plant life, animal life, ambient air quality.

"Introduce" means to cause to be present in a location. A material or item can be introduced into a location even if the material or item is released somewhere else and must travel some distance in order to reach the location. For example, if a substance is released at location A, and the substance will migrate over time to location B, the substance has been "introduced" into location B when it is released at location A. An item can be introduced in any manner appropriate under the circumstances for the substance to be introduced into the location.

An "effective amount" encompasses an amount of a material or item that will bring about a decrease in the amount of one or more contaminants in a location. An "effective amount" also encompasses an amount that brings about a stabilization of contaminant amounts or quantities in a location where they would otherwise increase or remain constant. It also encompasses an amount that brings about a reduction in the rate of increase of the amount or quantity of a contaminant in a location, as compared to the rate that would have obtained had the material or item not been introduced.

"Activate" means to modify or alter a substance in such a way that the substance is able to perform a function it was unable, or less able, to perform prior to activation. For example, "activation" encompasses the conversion of a persulfate ion into sulfate free radical, which is then able to oxidize other substances in a location. An "activator" is a substance or condition that that activates a substance. For example, an activator can include a metal, a chelated metal, a chelated iron, Fe-NTA, Fe(II)-EDTA, Fe(III)-EDTA, Fe(II)-citric acid, or Fe(III)-citric acid.

"Expose" means to cause to be, or become, available for interaction with other substances in the surroundings. For example, once a polymer-coated nanoparticle is "exposed," it is available to come into contact, chemically react, or otherwise interact with chemicals in the location into which it has been introduced.

A "reducing environment" or "reducing zone" is an environment in which substances are generally more likely to be reduced—e.g., have their oxidation numbers reduced, or gain electrons—than they are in another location. A reducing environment can also be conducive to the growth and metabolism of anaerobic organisms, as a reducing environment will eliminate species, such as oxygen, that might otherwise interfere with their growth or development.

An "oxidizing environment" or "oxidizing zone" is an environment in which substances are generally more likely to be oxidized—e.g., have their oxidation numbers increased, or lose electrons—than they are in another location. An oxidizing environment can also be conducive to the growth and metabolism of aerobic organisms.

In some embodiments, the invention relates to methods of using nano-scale (or larger-sized micro-sized powdered) zero valent iron (ZVI) particles coated with thin polymer films to provide sustained activation of persulfate and/or other oxidants in the subsurface for in situ chemical oxidation. The ZVI-polymer combination is referred to herein as "ZVIP" or, alternatively, "poly ZVI." The invention also relates to methods of controlling the rate of release of a metal activator so as to retain it in the subsurface for as long as the oxidant is retained. In one aspect, the invention prolongs the activation and concentration of the activator. As used herein, "zero valent" means an oxidation state of zero, i.e., without charge. As used herein, "oxidant" includes, for example, persulfate and sulfate free radical. The polymer-coated nanoparticles can be synthesized in situ, or they can be synthesized prior to introduction into the location to be remediated. The polymer-coated nanoparticles can be prepared by methods known in the art as well as those described herein. As used herein, "polymer-coated nanoparticles" encompasses, for example, polymer coated zero-valent iron particles.

Polymers that can be used to coat the ZVI particles include, for example, the biopolymers xanthan polysaccharide, polyglucomannan polysaccharide, emulsan, alginate biopolymers, hydroxypropyl methylcellulose, carboxy-methyl cellulose, ethyl cellulose, chitin, chitosan, and the synthetic polymers polymethyl methacrylate, polystyrene and polyurethane.

Additionally, zero valent manganese (ZVMn) can be substituted for zero valent iron in every embodiment discussed herein, as can other transition metals, such as cobalt, palladium, and silver. Furthermore, the zero valent metal, for example ZVI and/or ZVMn, can be associated with additional metals, such as palladium and cobalt, as well as other transition metals, for example those that can activate persulfate or increase the reactivity of ZVI, ZVMn, or another zero valent metal. Where more than one metal is present, they can be associated in, for example, a mixture or an alloy form. The particles can also comprise more than one metal.

In another aspect, the invention relates to methods of using nano- and micro-sized coated ZVI particles for sustained activation of Fenton chemistry and persulfate in the destruction of organic and inorganic contaminants in above and below ground remediation systems, water supply and waste water treatment systems, as well as industrial applications of Fenton's chemistry and activated persulfate, such as polymer initiators. As used herein, "remediation" means the improvement of the environmental quality of a location, whether such improvement is necessitated by the conduct of humans or otherwise. Drinking water treatment includes processing and treatment of surface and subsurface water to supply potable water whether the systems are large public water supply systems, individual home treatment units or in treatment of individual wells.

In another aspect, the invention relates to methods of using Fenton chemistry and persulfate activated with polymer coated ZVI particles to treat a wide range of organic compounds in industrial wastewaters. For example, organic compounds can include solvents, pesticides, herbicides, polychlorinated biphenyls, dioxin, fuel oxygenates, manufactured gas plants residuals, petroleum derived compounds, semivolatile compounds, and other chlorinated organic compounds. In still another aspect, the invention relates to methods of using polymer coated ZVI particles for sustained activation of Fenton Chemistry and persulfate in industrial waste treatment systems. As used herein, "nano-sized" and "nano-scale" mean particles less than about 1 micron in diameter, though a different meaning may be apparent from the context. As used herein, "micro-sized" and "micro-scale" mean particles from about 1 to about 1000 microns in diameter. As used herein, "macro-sized" and "macro-scale" mean particles greater than about 1000 microns in diameter. In yet another aspect, the invention relates to permeable reactive barriers containing mixtures of macro-, micro- and/or nano-sized PolyZVI particles with other, more mobile reductants. As used herein, "reductants" includes the organic compounds listed above as well as several inorganic compounds, such as perchlorate, chromate and arsenic. Additional reductants can be molasses, vegetable oils and other plant-based organic chemicals. The term "nanoparticles," as used herein, is intended to encompass nano-sized or micro-sized particles. In certain circumstances, "nanoparticles" can even encompass macro-sized particles, provided that the macro-sized particles would be effective according to the present invention.

As used herein, "polymer-coated nanoparticles" includes, for example, polymer coated ZVI particles, including nano-scale particles. "Polymer-coated nanoparticles" encompasses other metals that can be employed according to the present invention, such as manganese, cobalt, palladium, and others. The polymer coated nanoparticles can act as reducing agents as well as activators. A polymer coated nanoparticle can act as a reducing agent without serving as an activator, and vice-versa.

In another embodiment of the invention, the polymer coated ZVI or ZVMn particles can be emulsified using various surfactants enabling: 1) less reaction with subsurface materials and greater transport distance in the subsurface, 2) mixing with other S-ISCO™ (Verutek, Inc., Bloomfield, Conn.) reagents during preparation and injection into the subsurface, 3) coelution with S-ISCO reagents such as cosolvents, surfactants and oxidants or any combination thereof, 4) intimate contact in micelles with dissolved and emulsified NAPLs, better penetration into the subsurface for use as a reduction technology, and 5) greater compatibility and effectiveness for mixing ZVI and ZVMn with surfactants and plant based biologically degradable amendments, such as vegetable oils and molasses.

A surfactant and/or cosolvent can be a natural surfactant and/or cosolvent or a surfactant and/or cosolvent derived from a natural product, such as a plant oil or plant extract. The surfactant and/or cosolvent can be biodegradable. A surfactant can include mixtures of several surfactants and/or cosolvents. Frequently the preferred natural solvent such as those derived from plants are generally biodegradable, including terpenes. Terpenes are natural products extracted from conifer and citrus plants, as well as many other essential oil producing species. Compositions for use as surfactant and/or cosolvent liquid amendments for subsurface injection can include natural biodegradable surfactants and cosolvents. Natural biodegradable surfactants can include those that occur naturally, such as yucca extract, soapwood extract, and other natural plants that produce saponins, such as horse chestnuts (*Aesculus*), climbing ivy (*Hedera*), peas (*Pisum*), cowslip, (*Primula*), soapbark (*Quillaja*), soapwort (*Saponaria*), sugar beet (*Beta*) and balanites (*Balanites aegyptiaca*). Many surfactants derived from natural plant oils are known to exhibit excellent surfactant power, and are biodegradable and do not degrade into more toxic intermediary compounds.

Examples of surfactants and/or cosolvents that can be used include terpenes, *citrus*-derived terpenes, limonene, d-limonene, castor oil, coca oil, coconut oil, soy oil, tallow oil, cotton seed oil, and a naturally occurring plant oil. For example, additionally or alternatively, the surfactant can comprise *Citrus*Burst 1, *Citrus* Burst 2, *Citrus* Burst 3, or E-Z Mulse. For example, the surfactant and/or cosolvent can be a nonionic surfactant, such as ethoxylated soybean oil, ethoxylated castor oil, ethoxylated coconut fatty acid, and amidified, ethoxylated coconut fatty acid. For example, the surfactant and/or cosolvent can be ALFOTERRA 53, ALFOTERRA 123-8S, ALFOTERRA 145-8S, ALFOTERRA L167-7S, ETHOX HCO-5, ETHOX HCO-25, ETHOX CO-5, ETHOX CO-40, ETHOX ML-5, ETHAL LA-4, AG-6202, AG-6206, ETHOX CO-36, ETHOX CO-81, ETHOX CO-25, ETHOX TO-16, ETHSORBOX L-20, ETHOX MO-14, S-MAZ 80K, T-MAZ 60 K 60, TERGITOL L-64, DOWFAX 8390, ALFOTERRA L167-4S, ALFOTERRA L123-4S, and ALFOTERRA L145-4S.

For example, the surfactant can comprise a surfactant/cosolvent mixture, in which case, the co-solvent can comprise of dilimnone, terpinoids, alchohols, or plant-based solvents. For example, a composition of surfactant and cosolvent can include at least one *citrus* terpene and at least one surfactant. A *citrus* terpene may be, for example, CAS No. 94266-47-4, *citrus* peels extract (*citrus* spp.), *citrus* extract, Curacao peel extract (*Citrus aurantium* L.), EINECS No. 304-454-3, FEMA No. 2318, or FEMA No. 2344. A surfactant may be a nonionic surfactant. For example, a surfactant may be an ethoxylated castor oil, an ethoxylated coconut fatty acid, or an amidified, ethoxylated coconut fatty acid. An ethoxylated castor oil can include, for example, a polyoxyethylene (20) castor oil, CAS No. 61791-12-6, PEG (polyethylene glycol)-10 castor oil, PEG-20 castor oil, PEG-3 castor oil, PEG-40 castor oil, PEG-50 castor oil, PEG-60 castor oil, POE (polyoxyethylene) (10) castor oil, POE (20) castor oil, POE (20) castor oil (ether, ester), POE (3) castor oil, POE (40) castor oil, POE (50) castor oil, POE (60) castor oil, or polyoxyethylene (20) castor oil (ether, ester). An ethoxylated coconut fatty acid can include, for example, CAS No. 39287-84-8, CAS No. 61791-29-5, CAS No. 68921-12-0, CAS No. 8051-46-5, CAS No. 8051-92-1, ethoxylated coconut fatty acid, polyethylene glycol ester of coconut fatty acid, ethoxylated coconut oil acid, polyethylene glycol monoester of coconut oil fatty acid, ethoxylated coco fatty acid, PEG-15 cocoate, PEG-5 cocoate, PEG-8 cocoate, polyethylene glycol (15) monococoate, polyethylene glycol (5) monococoate, polyethylene glycol 400 monococoate, polyethylene glycol monococonut ester, monococonate polyethylene glycol, monococonut oil fatty acid ester of polyethylene glycol, polyoxyethylene (15) monococoate, polyoxyethylene (5) monococoate, or polyoxyethylene (8) monococoate. An amidified, ethoxylated coconut fatty acid can include, for example, CAS No. 61791-08-0, ethoxylated reaction products of coco fatty acids with ethanolamine, PEG-11 cocamide, PEG-20 cocamide, PEG-3 cocamide, PEG-5 cocamide, PEG-6 cocamide, PEG-7 cocamide, polyethylene glycol (11) coconut amide, polyethylene glycol (3) coconut amide, polyethylene glycol (5) coconut amide, polyethylene glycol (7) coconut amide, polyethylene glycol 1000 coconut amide, polyethylene glycol 300 coconut amide, polyoxyethylene (11) coconut amide, polyoxyethylene (20) coconut amide, polyoxyethylene (3) coconut amide, polyoxyethylene (5) coconut amide, polyoxyethylene (6) coconut amide, or polyoxyethylene (7) coconut amide.

Examples of surfactants derived from natural plant oils are ethoxylated coca oils, coconut oils, soybean oils, castor oils, corn oils and palm oils. A surfactant and/or cosolvent can be or can be derived from a plant extract or a biodegradable plant extract. Many of these natural plant oils are U.S. FDA GRAS (Generally Recognized As Safe).

In Surfactant Enhanced In Situ Chemical Oxidation (S-ISCO), surfactants and/or cosolvents can be injected into the soil and/or groundwater. The surfactants and/or cosolvents can facilitate contact between the contaminants or COCs and an injected substance such as, for example, an oxidant and thereby promote elimination, breakdown or another form of neutralization of the contaminants or COCs by the injected substance. For example, the surfactants and/or cosolvents can induce the formation of a Winsor Type I system within a nonaqueous phase liquid (NAPL) contaminant and thereby promote diffusion of an injected oxidant or species derived therefrom, such as persulfate, to the NAPL, so that the injected oxidant or species derived therefrom oxidizes the NAPL. For example, polymer coated ZVI or ZVMn particles can be used as activators of an oxidant, such as persulfate or peroxide, injected into soil in an ISCO or S-ISCO remediation process.

The term "oxidant" includes all oxidizing compounds or compounds that decompose or react to form an oxidizing compound. For example, the term "oxidant" includes solid, liquid, or gaseous compounds that can decompose to liberate oxygen or an oxidizing species. For example, the term "oxidant" includes compounds such as persulfates, percarbonates, peroxides, hydrogen peroxide, and permanganates. For example, the term "oxidant" also includes oxidizing gases, such as oxygen, ozone, and air. For example, the term "oxidant" also includes dissolved gases, such as oxygen or ozone, dissolved in an aqueous or non-aqueous liquid.

The invention also relates to a method of using polymer coated particles, a surfactant or mixture of cosolvents and surfactants that are used to emulsify the polymer coated particles simultaneously with solubilizing or emulsifying plant oils or other plant extracts that are together injected into the subsurface or spread on the ground to create a zone combining physical, chemical and/or biological processes, or any combination thereof to reductively destroy or transform organic or inorganic contaminants in the environment. The biological processes can involve, for example, anaerobic organisms. As used herein, "blending" includes, for example, emulsifying, solubilizing, or a combination thereof.

As used herein, "reducing agent" includes, for example, zero valent metal particles. As used herein, "half-life" means the time required for one half of a process to be completed, for example the time required for one half of a reagent to be consumed during a reaction.

According to the invention, injecting nanoscale and microscale ZVI into the subsurface to create reduction zones have been focused on two key aspects: 1) creating a matrix in which the ZVI is emplaced that allows transport of the ZVI into the subsurface with a minimum amount of reaction of the ZVI particles with, or adhesion of the ZVI particles to, the subsurface mineralogy, for example to prevent clogging and to promote penetration of the ZVI particles through the subsurface soil; and 2) addition of a biological substrate such as molasses or vegetable oil, which can provide a longer term biologically created reduction zone than that achievable with nanoscale or microscale ZVI alone.

A major goal of in situ remediation using chemical oxidation is to maximize the volume of soil treated for each injection well or injection location. One key factor affecting the volume of soil treated is the longevity of the oxidant in the subsurface, given injection flow rates, oxidant concentration, volume of injected fluid, mass of oxidant added and the type of activation system used. When activation is required, such as in the case of oxidants such as persulfate and peroxide, the longevity of the activator should ideally be close to that of the oxidant. To date, no activation system has been demonstrated to have as long a life in the subsurface as persulfate. The polymer coated ZVI according to an aspect of the invention enables a more controlled time-release of the metal activator and/or a more controlled rate of activation of oxidants such as persulfate and peroxide than is possible with previously known metal-chelate systems.

While one aspect of the invention involves methods of activating persulfate for in situ chemical oxidation remediation, activation of hydrogen peroxide can similarly be successful. Additionally, nano- or larger-scale ZVI material coated with, for example, partitioning polymers, surfactant materials or electrically conducting polymers can be applied in the remediation of dense non-aqueous phase liquid (DNAPL), light non-aqueous phase liquid (LNAPL) treatment, and for other contaminants and chemicals of concern. In addition, an aspect of the invention can be utilized in the air purification, and water supply. Production chemical and polymer activation could be novel applications of coated zerovalent iron.

Furthermore, other substances, for example other transition metals, can be used in place of zero valent iron in activation systems for persulfate, peroxide and other oxidants. In addition, the invention can be employed in contexts other than treatment and remediation. For example, polymer coating of macro-sized ZVI particles, typically used for permeable reactive barriers (PRBs), could greatly extend the life of these barriers, perhaps by a factor or two or more, by adding resistant polymer coatings to the ZVI particles that can be removed by some specialized chemistry, such as an acid or base rinse, chemical stripping, thermal or electrical processes or certain biological processes. As used herein, "removing agent" means compounds or other substances that possess the ability to remove the polymer coating from a zero valent iron particle or other activator particle. Mixtures of polymer coated ZVI particles with non-polymer coated particles could be used in PRBs, radically changing how this technology is used. Once non-coated ZVI particles have been exhausted and are no longer able to sufficiently reduce target contaminants (e.g., after a 20 year life), then the polymer coated ZVI particles could be treated in situ to remove the coatings and obtain a second 20 year period of PRB life.

Additionally, polymer coated ZVI can be used to create hydrophobic particles for remediation, for example for DNAPL partitioning. ZVI particles can be coated with multiple polymer layers. For example, the polymer layers can be of varying polymer type and polymer layer thickness. A set of ZVI particles having different thicknesses of polymer coating can be used in remediation. The distribution of polymer coating thicknesses can be tailored to control the rate at which the ZVI particles activate oxidant or reduce contaminants and/or other compounds in the environment at various times in the remediation process. One purpose of the polymer coated ZVI may be to act as an activator of an oxidant, and therefore it is important that it remains capable of activating the oxidant for as long as there is oxidant to be activated in the location. It is also important that the activator is not consumed too rapidly. One way to prevent rapid consumption is to apply a polymer coating to the activator. For example, the polymer coating can limit the rate at which the activator is exposed to the oxidant.

In addition, the activator should travel as far as the oxidant in the location to be remediated. An uncoated activator may adhere to soil particles, which would inhibit the activator's migration through the location. By applying a polymer coating to the activator surface, activator adherence to soil particles is minimized.

In addition, altering the polarity and electrolytic conductivity of the polymer can enable control of sorptive processes, including potential partitioning into LNAPL and DNAPL mixtures. For example, the following factors can be adjusted in applying poly-ZVI to in situ applications: (i) the type of polymer used, based on its reactivity with an oxidant such as persulfate, biodegradation of by-products and ability of ZVI to be coated; (ii) the thickness of the coating, to control the rate at which the zero valent iron is exposed to oxidants such as persulfate resulting in a controlled rate of free radical production; (iii) the molecular size and other physical properties of the polymer, to control penetration of the polymer into the nano-scale ZVI; (iv) the electrolytic conductivity of the coating, to avoid or induce sorption of the ZVIP onto various mineral and organic materials, as appropriate for remediation applications; and (v) the polarity of the polymer coating, to control adsorptive and absorptive partitioning of the ZVIP with natural organic carbon, bacterial mass and potentially LNAPL and DNAPL.

In one aspect, the invention can be used in the oxidation of chlorinated solvents (including DNAPLs), DNAPLs, non-chlorinated solvents (e.g., gasoline hydrocarbons and MTBE), semi-volatile organic hydrocarbons (SVOCs) (e.g., at manufactured gas plant sites), fuel oxygenates, 1,4-dioxane, pesticides, herbicides and selected metals. In addition, an aspect of the invention can be useful at former Manufactured Gas Plant (MGP) sites, drycleaner sites, DNAPL sites, and methyl tertiary-butyl ether (MTBE) sites.

EXAMPLES

Example 1

Coating of NZVI, NZVMn, and Bimetallic NZVI, NZVMn

In the past, the use of nanoparticle zero valent iron (NZVI) and nanoparticle zero valent manganese (NZVMn) has been limited in environmental applications because NZVI and NZVMn particles produced by previously-existing methods can aggregate into larger particles, thus losing their surface area to mass benefit. Additionally, the NZVI and NZVMn particles can be highly reactive, and their surfaces can become quickly passivated and oxidized. In many applications, including those for remediation, there is a need for these particles to remain, and to retain reactivity, for months or even years. Coating the NZVI and NZVMn particles can greatly reduce the rapid agglomeration, oxidation, and passivation of the nanoscale particles.

In a green approach according to certain embodiments of the invention, bulk quantities of nanocomposites containing, for example, transition metals such as Cu, Ag, In, and Fe, can be produced at room temperature by reacting respective metal salts with the sodium salt of a biodegradable polymer such as CMC in aqueous media. These nanocomposites exhibit broader decomposition temperatures when compared with control CMC. In addition, Ag-based CMC nanocomposites exhibit a luminescent property at longer wavelengths. The noble metals such as Au, Pt, and Pd do not react at room temperature with aqueous solutions of CMC, but do so rapidly under microwave irradiation (MW) conditions at 100° C. This environmentally benign approach provides facile entry to the production of multiple shaped noble nanostructures while avoiding the use of a toxic reducing agent such as sodium borohydride ($NaBH_4$), hydroxylamine hydrochloride, etc. The approach does not require a separate capping/surfactant agent. The approach uses a benign biodegradable polymer CMC. Thus, the approach can find widespread technological application in producing nanoparticles useful for medicinal and land remediation problems. The nanocomposites obtained at room temperature and microwave conditions were characterized using scanning electron microscopy, transmission electron microscopy, infrared spectroscopy, UV-visible spectroscopy, X-ray mapping, energy-dispersive analysis, and thermogravimetric analysis.

The green synthesis pathway of zero valent metals and bimetallic species using plant reducing agents along with biopolymers with and without VeruTEK's VeruSOL™, a green cosolvent-surfactant system comprising a mixture of U.S. FDA Generally Recognized as Safe (GRAS) *citrus* and plant extract-based materials, can be used to make hydrophobic organic coated NZVI and NZVMn to enhance solvophobicity (in the case of both monometallic and bimetallic particles). The coatings may also exhibit amphiphilic properties when surfactant molecules are present in the composite matrix. The coatings and composite structures of these nano-metal species can also exhibit anionic, cationic, or zwitterionic surface charge properties.

Example 2

Trial Production of nZVI Particles with Green Tea Extract and Ferric Chloride in the Presence of Carboxy Methyl Cellulose (CMC), VeruSOL-3™, and/or Trichloroethylene (TCE)

Figure 6:
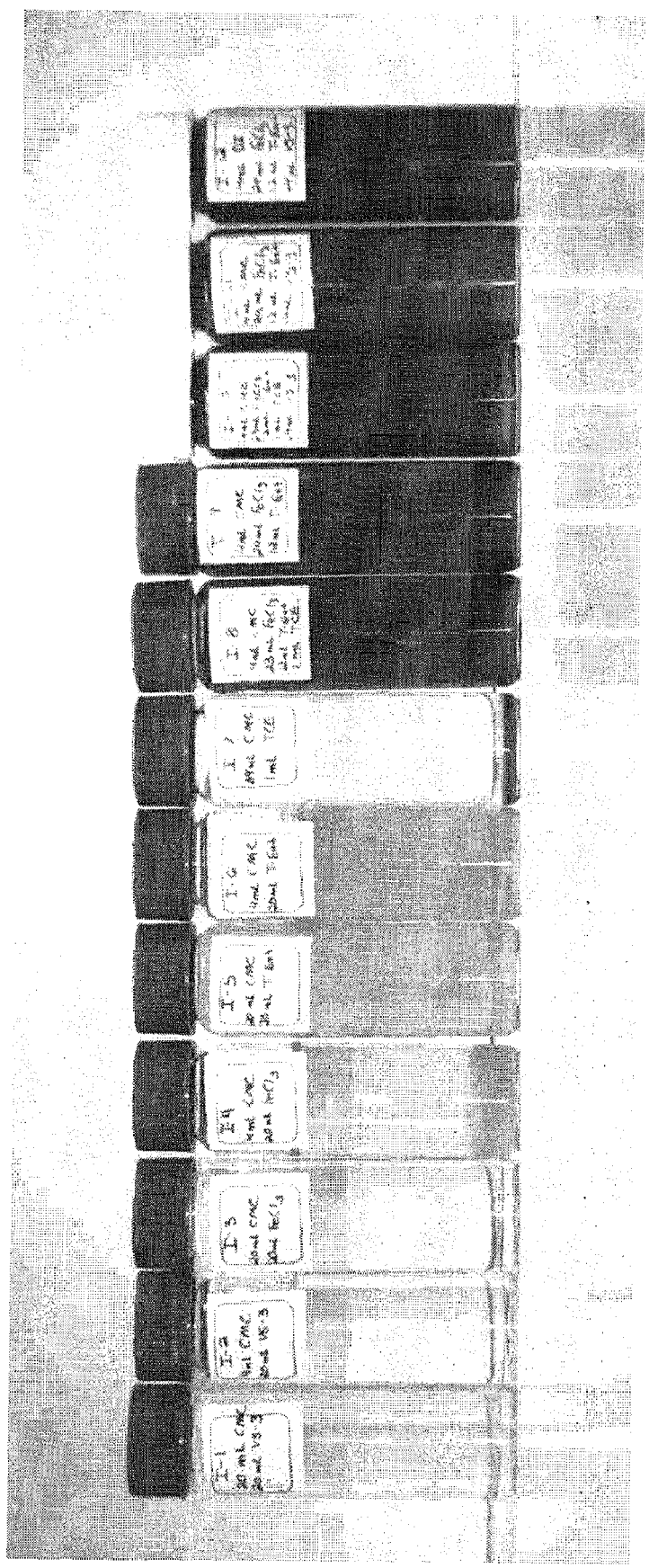
FIG. 6 presents a photograph of vials illustrating the compatibility of carboxymethyl cellulose, VeruSOL™-3 (Verutek, Inc., Bloomfield, Conn.) and trichloroethylene with green tea & ferric chloride synthesized nanoscale zero valent iron.
Figure 7:
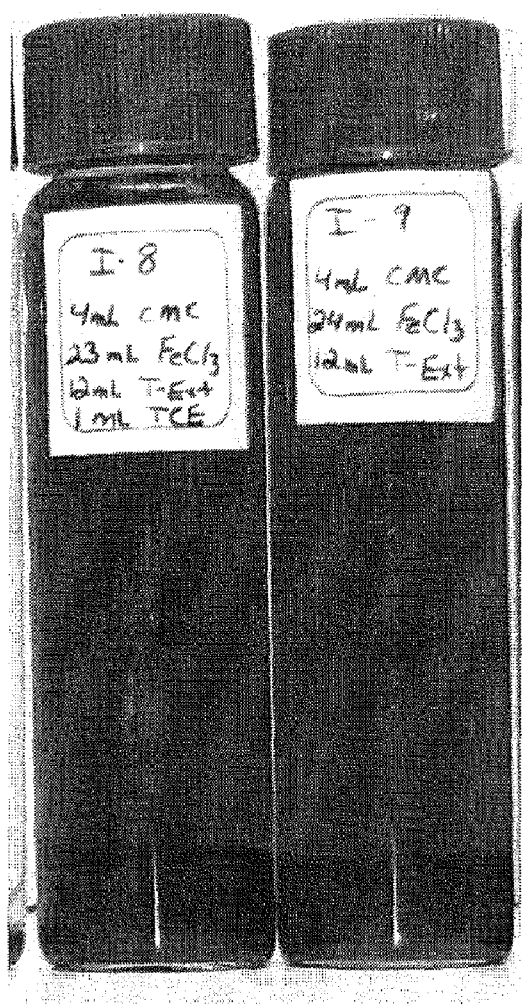
FIG. 7 presents a photograph of vials illustrating the compatibility of carboxy methyl cellulose (CMC), VeruSOL™-3, and Trichloroethylene with green tea and ferric chloride synthesized nanoscale zero valent iron.

A series of batch tests were conducted to evaluate whether it is possible to produce nZVI via green synthesis using green tea extract and ferric chloride with the following: a) carboxy methyl cellulose (CMC); b) VeruSOL™-3; and c) trichloroethylene (TCE). Testing conditions are shown in Table 1. The photograph of the test vials is shown in FIG. 6. In Test Vials I-1 and I-2, the compatibility of carboxy methyl cellulose with VeruSOL™-3 was evaluated at two CMC concentrations. In both cases, separation into phases was not observed when CMC and VeruSOL™-3 were mixed together. In Test Vials I-2 and I-3, the ability of carboxy methyl cellulose to chelate the iron in ferric chloride was evaluated. When 4 mL of a saturated CMC solution was added to a 0.1 N ferric chloride, precipitation of iron was observed as seen in FIG. 6 for Test Vial I-4. However, when 20 mL of a saturated CMC solution was added to a 0.1 N ferric chloride, there was no precipitation and the ferric chloride was fully chelated. In Test Vials I-5 and I-6, the compatibility of CMC and green tea extract were evaluated to determine if there would be separate phase reaction products. Phase separation was not observed in either vial, as seen in FIG. 6. In Test Vial I-7, the compatibility of CMC with pure phase trichloroethylene was evaluated. No reaction was observed between TCE and CMC. In Test Vials I-8 and I-9, the preparation of nZVI using ferric chloride and green tea extract was evaluated in the presence of CMC (I-9) and in the presence of CMC and pure phase TCE (I-8). There were no apparent difference in the ability to form nZVI particles when CMC and CMC plus TCE were present. A layer of TCE under the settled nZVI is observed in the two test vials shown in FIG. 7.

Figure 8:
FIG. 8 presents a photograph of vials illustrating the compatibility of carboxy methyl cellulose (CMC) and VeruSOL™-3 with green tea and ferric chloride synthesized nanoscale zero valent iron.

In Test Vial I-10, the synthesis of nZVI using ferric chloride and green tea was evaluated in the presence of CMC, TCE, and VeruSOL™-3. As can be seen in FIG. 6, the appearance of this test was similar to that of Test Vial I-8 (similar conditions to Test Vial I-10 but without TCE); however, the TCE appeared to attach to the glass walls of the Test Vial in I-8. In Test Vials I-11 and I-12, the effects of the addition of VeruSOL™-3 on the synthesis of nZVI using ferric chloride and green tea extract were evaluated in the presence of CMC (Vial I-11) and absence of CMC (Vial I-12). In both cases the addition of VeruSOL™-3 stabilized the nZVI and inhibited much of the agglomeration and settling observed when VeruSOL™-3 was not added during the synthesis of nZVI using ferric chloride and green tea extract (See FIG. 8).

VeruSOL™-3, which is a mixture of d-limonene and nonionic surfactants consisting of ethoxylated plant oils, can be used to dissolve a variety of organic liquids, including TCE (see U.S. application Ser. No. 12/068,653, which is hereby incorporated by reference in its entirety). As demonstrated by the test results presented in FIG. 6, nZVI can be prepared using ferric chloride and green tea extract in the presence of TCE without affecting particle formation. NZVI can also be made using the above-described synthesis process in the presence of VeruTEK's VeruSOL™-3. The resulting composition permits the controlled dissolution of Non Aqueous Phase Liquids (NAPL). Additionally, nZVI can be made in situ in the presence of pure phase TCE.

TABLE 1

Compatibility of Carboxy Methyl Cellulose, VeruSOL ™-3 and Trichloroethylene with Green Tea & Ferric Chloride Synthesized Nanoscale Zero Valent Iron

| Test | CMC Saturated Water mL | VS-3 (10 g/L) mL | Pure VS-3 mL | $FeCl_3$ mL | Green Tea-Extract mL | Dyed Pure TCE mL |
|---|---|---|---|---|---|---|
| I-1 | 20 | 20 | | | | |
| I-2 | 4 | 20 | | | | |
| I-3 | 20 | | | 20 | | |
| I-4 | 4 | | | 20 | | |
| I-5 | 20 | | | | 20 | |
| I-6 | 4 | | | | 20 | |
| I-7 | 40 | | | | | 1 |
| I-8 | 4 | | | 24 | 12 | 1 |
| I-9 | 4 | | | 24 | 12 | |
| I-10 | 4 | | 0.4 | 24 | 12 | 1 |
| I-11 | 4 | | 0.4 | 24 | 12 | |
| I-12 | | | 0.4 | 24 | 12 | |

Notes:
1) Reagants: Carboxy methyl cellulose (CMC) Saturated Water, VeruSOL ™-3 ("VS-3"), $FeCl_3$, Green Tea Extract, Dyed Pure TCE
2) Tests conducted in 40 mL vials
3) Interfacial tension and photographs taken 24 hours after a 1 minute initial mixing period
4) Concentrations of VeruSOL ™-3 used results in 10 g/L concentration in vial
5) 0.1 M ferric chloride used in test
6) Carboxy methyl cellulose used from a saturated solution (~3%) of sodium carboxy methyl cellulose (MW-90,000)

Example 3

Production of nZVI Particles in Dispersion Using Attritor

Zero valent iron nanoparticles can be prepared through milling or grinding techniques, as described in U.S. Pat. No. 7,128,841 to Zhang (incorporated by reference in its entirety). Iron particles up to 10 μm in diameter are combined with one or more dispersing agents, such as sodium polymethacrylate and ammonia polymethacrylate (sold under the trade names Darvan 811 and Darvan C, respectively), and water. This composition can comprise, for example, about 69% water, about 29% iron particles, and about 1-2% dispersant. This composition is then fed into a device called an attritor. The attritor chamber contains a grinding media, such as iron or steel beads of 100-250 μm diameter, which fills about 80-85% of the chamber. The attritor central shaft is then set in motion at a speed of about 2200-2400 rpm. The motion of the central shaft in turn moves grinding rods, which create shear forces that grind the dispersed iron particles. The iron particles are ground in this fashion for about 4 hours. The resulting dispersion comprises nanoparticles of zero valent iron. For example, the nanoparticles can have a diameter of 100 nanometers or less. The resulting nanoparticles can then be combined with an appropriate polymer composition according to the present invention.

Example 4

In Situ Formation of Metal Nanoparticles

A method according to the invention was used to produce nanoscale zero valent iron particles (NZVI) in soil columns, as a simulation of in situ formation of nanoscale iron particles in soil. Two column experiments were conducted to evaluate the potential for in situ generation of NZVI using $Fe(NO_3)_3$ and either green tea extract or lemon balm extract. Two stock solutions were each injected in an upflow mode into soil columns packed with ASTM 20/30 sand with the dimension of 300 cm long by 30 cm diameter. For Column 2, green tea extract and 0.1 M $Fe(NO_3)_3$ were each simultaneously injected at flowrates each at 0.15 mL/min for a total injected flowrate of 0.30 mL/min.

The green tea extract was made as follows: 200 mL of deionized water were heated in a beaker to a temperature of 82° C. and 4.01 grams of Chunmee green tea was added. The beaker was covered with aluminum foil and the tea was heated in the water for 5 minutes. The Lemon Balm Extract was made following the same procedure as used in making the green tea. After 5 minutes, the beaker was removed from the heat and the tea was allowed to settle for 1 hour and return to 25° C. The tea extract supernatant was then removed from the beaker and either immediately used or stored at 4° C. for later use.

Figure 2:
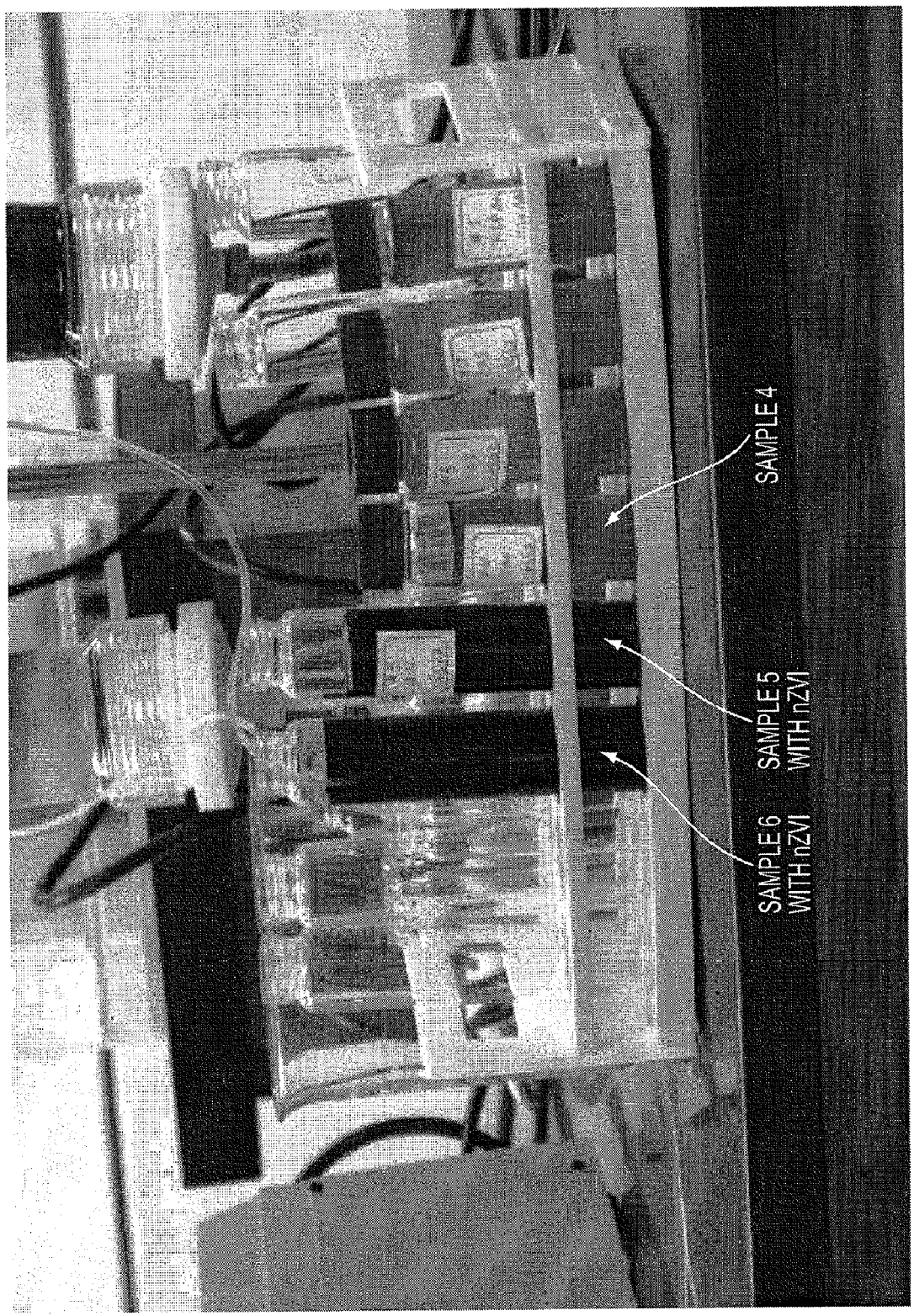
FIG. 2 presents a photograph of vials containing Column 2 collected effluent samples green tea extract with $Fe(NO_3)_3$.
Figure 3:
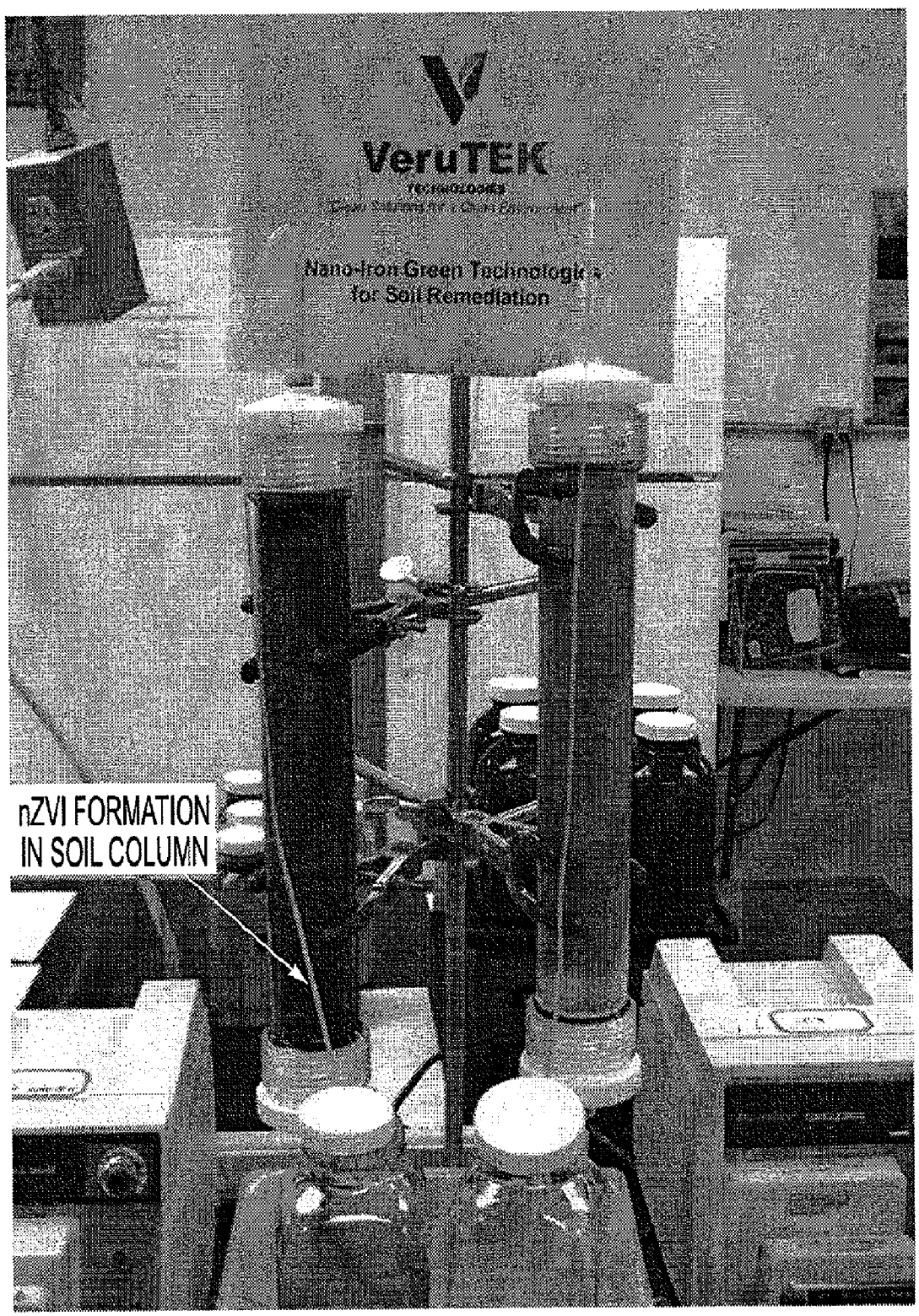
FIG. 3 presents a photograph illustrating a comparison of Column 1 containing nZVI and a Control Column at completion of test—lemon balm extract with $Fe(NO_3)_3$.
Figure 4:
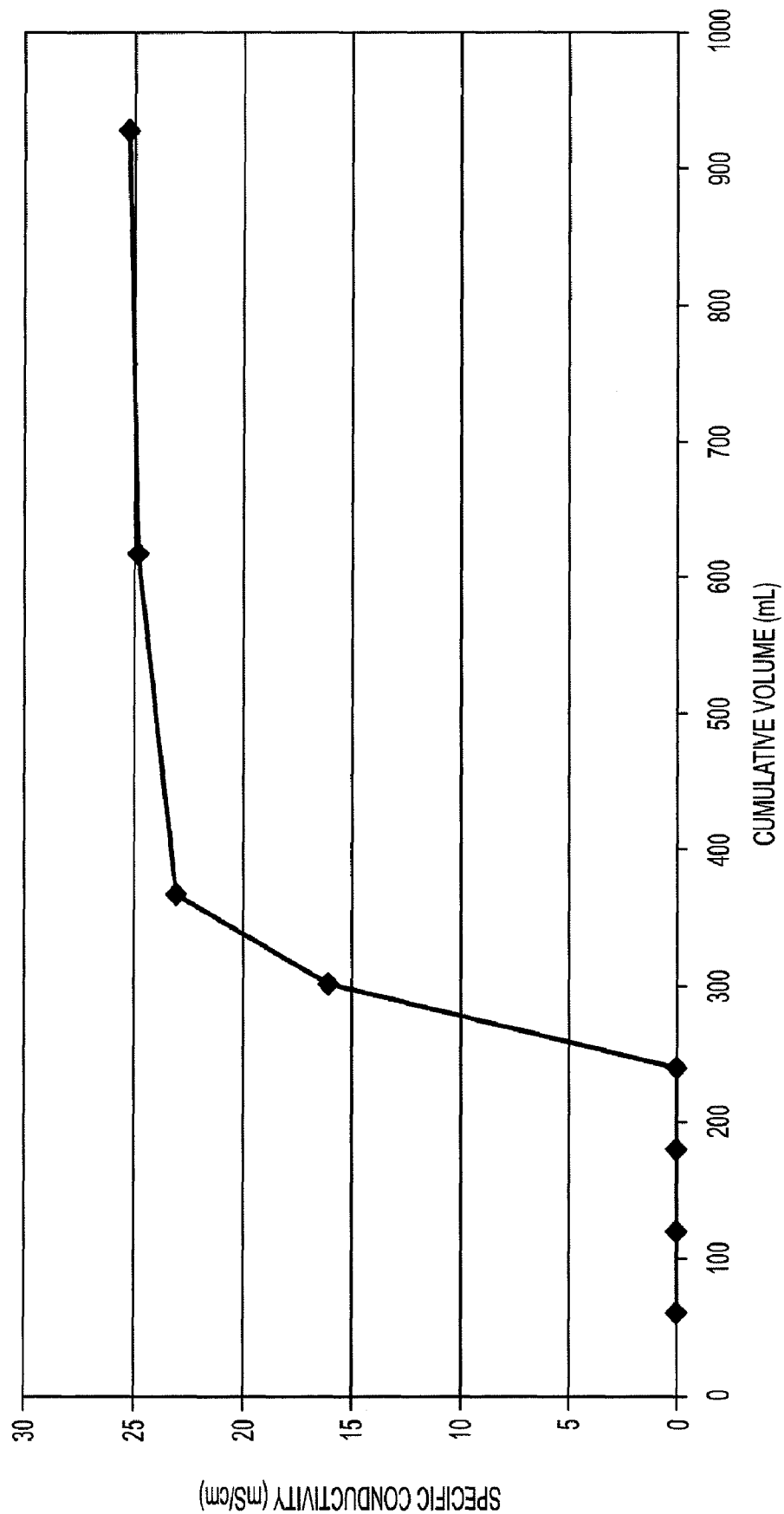
FIG. 4 presents a graph of electrolytic conductivity as a function of cumulative effluent volume in column 1—lemon balm extract and $Fe(NO_3)_3$.
Figure 5:
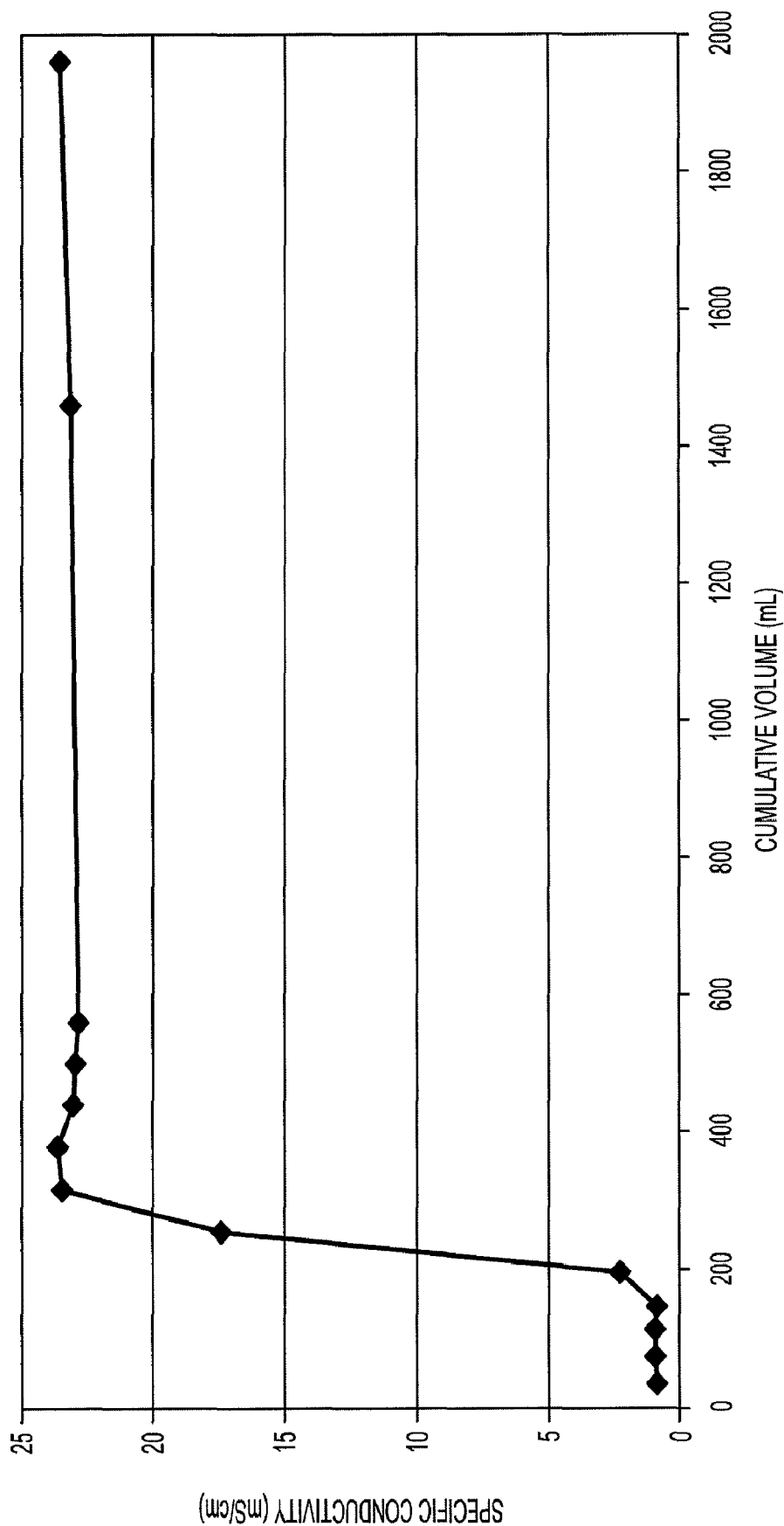
FIG. 5 presents a graph of electrolytic conductivity as a function of cumulative effluent volume in column 2—green tea extract and $Fe(NO_3)_3$.

The initial formation of nZVI in the bottom (inlet) of the soil column was observed in the bottom of Column 2, as shown in FIG. 1. Effluent from Column 2 was collected and sampled for electrolytic conductivity and was visually observed and photographed. A photograph of the initial samples collected from Column 2 is shown in FIG. 2. Sample number 4 was collected between effluent volumes of from 117 mL to 150 mL in a 40 mL sample vial and represented approximately 0.56 pore volumes of flow through the column. Sample number 5 was collected between effluent volume from 150 mL to 200 mL in a 60 mL sample vial and represented approximately 0.74 pore volumes of flow through the column. Sample number 6 was collected between effluent volumes of from 200 mL to 259 mL in a 60 mL sample vial and represented approximately 0.96 pore volumes of flow through the column. The electrolytic conductivity values for Samples 4, 5, and 6 were 0.86 mS/cm, 2.27 mS/cm, and 17.4 mS/cm, respectively. It can also be seen from examination of the effluent sample photographs in FIG. 2 that the nZVI began eluting from the column between Samples 4 and 5. A comparison of the Lemon Balm Extract and 0.1 M $Fe(NO_3)_3$ Column (Column 1) to a control column (no Lemon Balm Extract or ferric nitrate) shown in FIG. 3 clearly shows the accumulation of nZVI in the column, but the nZVI continued to elute from the column as long as the test runs were conducted. The electrolytic conductivity of the Column 1 (Lemon Balm Extract and 0.1 M $Fe(NO_3)_3$) effluent is shown in FIG. 4. It is evident that the nZVI eluted from the column and continued to elute after breakthrough. The same trend is evident in Column 2 (Green Tea Extract and 0.1 M $Fe(NO_3)_3$), as is shown in FIG. 5.

Example 5

Pilot Test of nZVI with S-ISCO

A Pilot Test is performed by remediating a portion of a site of a former manufactured gas plant (MGP). The site is contaminated with hydrocarbons.

The Pilot Test area includes twelve injection wells: six wells for the combined injection of the ZVI nanoparticle activator and the *Citrus* Burst-3 cosolvent-surfactant and six wells for the injection of the sodium persulfate oxidant. The injection wells (IW) are installed about 3 feet from each other in two rows perpendicular to the direction of groundwater flow. The outlet of the injection wells is from 12 to 15 feet below ground surface. The Pilot Test treatment area extends approximately 60 feet downgradient from the injection wells and 10 feet to either side of the injection wells (i.e., the Pilot Test Area is approximately 40 feet wide and 60 feet long). The Pilot Test area includes 27 monitoring wells (Pilot Test Monitoring Wells: PTMW) installed for monitoring of system performance. Monitoring of system performance additionally takes place upgradient and downgradient of the Pilot Test area using 16 existing groundwater monitoring wells. Monitoring tests performed in an on-site laboratory include measurements of temperature, turbidity, IFT (interfacial tension), dissolved iron concentration, nZVI, pH, specific conductivity, dissolved oxygen, persulfate concentration, and ORP (oxidation-reduction potential). Troll® 9500 devices measure pH, specific conductivity, dissolved oxygen, temperature, turbidity, and ORP.

Performance monitoring is conducted at monitoring well locations upgradient, downgradient and side-gradient of the injection points to determine the distribution of the injected surfactant enhanced activated persulfate in the subsurface and the movement of the enhanced activated persulfate front. Performance monitoring is initiated three days prior to start up of the S-ISCO™ injection system and continues throughout the testing and for 31 days after injection ceases. The objective of monitoring after the injection is to gain an initial understanding of the persistence of the S-ISCO™ chemicals once injection is terminated and also effectiveness of the S-ISCO™ application at reducing the groundwater flux migrating from the Pilot Test area.

A total of 72,674 kg of persulfate, 3314 kg of *Citrus* Burst-3 (cosolvent-surfactant) and 475 kg of nZVI are injected into the subsurface during the Pilot Test. Groundwater monitoring is performed during the Pilot Test to track the distributions of injected reagents. The performance monitoring results indicate that surfactant and oxidant mixtures reach most of the Pilot Test Area. This Pilot Test successfully demonstrates that specific MGP contaminated subsurface strata, whether they occur at shallow, deep or intermediate depths, can be targeted and treated using controlled solution densities and selected injection flow rates. The monitoring data also demonstrates that S-ISCO® mixtures travel together (co-eluted) to targeted soil zones and contaminants are solubilized and destroyed.

Example 6

Testing of Polymer-ZVI Blends

A series of zero headspace aqueous batch tests are conducted with a variety of polymer-coated ZVI blends to determine the rate of activation of persulfate as measured by the decay rates of persulfate and the oxidation of probe compounds. Trichloroethylene, methyl tertiary butyl ether (MTBE) and benzene are used as the probe compounds. Reaction byproducts of the polymer are identified. Control tests are used to determine the fate of the ZVI-polymer mixtures in water blanks. Control tests for non-oxidative volatile organic compound (VOC) losses are conducted for VOCs in water blanks containing the target VOC compounds and the polymer without the ZVI. VOC-water blanks are used to assess volatile losses from the zero headspace systems and sample handling procedures. Samples are taken over time from the aqueous batch systems to determine VOC reaction rates and the fate of the coated polymer. Up to ten polymer blends are screened and less than five polymers are chosen for further testing conducted in the presence of soils.

Next, sorptive partitioning of the ZVI-polymer mixtures with three aquifer materials are investigated using two low $f_{oc}$ sands (Borden Sand with the properties of a well buffered, calcareous derived material and a Glacial Outwash Sand with the properties of a poorly buffered material) and a higher $f_{oc}$ silty sand material. Persulfate soil oxidant demand (SOD) tests are conducted on each of the materials using both batch and column tests, with and without the ZVI materials present. Separate polymer blends are created that have varied partitioning characteristics, including blends that possess little or no sorptive partitioning onto $f_{oc}$ and mineral surfaces and ones with higher partitioning characteristics. The tests described here include batch soil-aqueous systems, aqueous- DNAPL (i.e., TCE) and aqueous-LNAPL (i.e. benzene) systems and soil column experiments (clean soils with no VOCs).

Next, several larger-scale column tests are conducted for a selected number of ZVI-polymer blends tested. One polymer blend applied at varying thickness on the ZVI injected simultaneously with persulfate allows a time-release function providing for sustained persulfate activation. Alternatively, a soil column is loaded with sorbed ZVIP, based on partitioning of the ZVIP with the three soils tested, then flushed with persulfate. Soil columns containing pure phase TCE and benzene are investigated, as well as soil columns receiving separate but continuous injections of dissolved phase TCE, benzene and MTBE.

Example 7

Preparation of Polymer-Coated Nanoparticles

An aqueous solution of one or more polymers (e.g., guar gum or chitson or chitosan, or any other polymer according to the present invention) is prepared. An appropriate volume of the solution is combined with a suspension of iron particles. The combination is mixed until the particles are coated. The coating can then be verified, and the size of the coated particles and their surface characteristics determined, using appropriate techniques, such as by analyzing a sample using electron microscopy or a Zetasizer system (Malvern Instruments Ltd., Malvern, UK).

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

The invention claimed is:

1. A method for decreasing the amount of one or more contaminants in contaminated soil, comprising:
    obtaining polymer-coated nanoparticles comprising a biodegradable polymer coating, and
    introducing the polymer-coated nanoparticles into the contaminated soil in an amount effective to decrease the amount of one or more contaminants in the soil, wherein the contaminated soil contains contaminants comprising a non-aqueous phase liquid and wherein the polymer coated nanoparticles partition into the non-aqueous phase liquid.

2. The method of claim 1, comprising also introducing an oxidant into the contaminated soil, wherein the nanoparticles activate the oxidant.

3. The method of claim 2, wherein the oxidant is persulfate.

4. The method of claim 2, wherein the activated oxidant oxidizes one or more contaminants in the contaminated soil, thereby decreasing the amount of one more contaminants present in the contaminated soil.

5. The method of claim 1, wherein the polymer-coated nanoparticles create a reducing environment in the contaminated soil.

6. The method of claim 5, wherein the reducing environment promotes the growth and metabolism of anaerobic microorganisms, and wherein the anaerobic microorganisms decrease the amount of one or more contaminants present in the contaminated soil.

7. The method of claim 1, wherein the polymer-coated nanoparticles comprise zero-valent iron and/or zero-valent manganese, and wherein the polymer-coated nanoparticles have a diameter no greater than about 1 micron.

8. The method of claim 1, wherein the biodegradable polymer is selected from the group consisting of xanthan polysaccharide, polyglucomannan polysaccharide, emulsan, an alginate biopolymer, hydroxypropyl methylcellulose, carboxymethyl cellulose, ethyl cellulose, chitin, chitosan, polyvinyl alcohol, polyvinyl esters, polyvinyl amides, copolymers of polylactic acid, and combinations thereof.

9. The method of claim 1, wherein the biodegradable polymer composition comprises carboxymethyl cellulose.

10. A method for decreasing the amount of one or more contaminants in contaminated soil, comprising:
    obtaining polymer-coated nanoparticles comprising a polymer coating;
    obtaining an oxidant; and
    introducing the polymer-coated nanoparticles and the oxidant into the contaminated soil in amounts effective to decrease the amount of one or more contaminants in the soil, wherein the polymer coating comprises a polymer selected from the group consisting of polymethyl methacrylate, polystyrene, polyethylene glycol, polyurethane, and combinations thereof.

11. The method of claim 1, wherein the polymer-coated nanoparticles remain able to activate an oxidant in a location in need of remediation for at least as long as an oxidant capable of oxidizing contaminant remains in the location.

12. The method of claim 11, wherein the nanoparticles travel as far through the location as does the oxidant.

13. The method of claim 1, wherein the polymer coating is selected from the group consisting of a partitioning polymer, a surfactant material, a material capable of conducting an electric current, a hydrophobic material, a water-insoluble material, an oil-insoluble material, a material permeable to an atomic or molecular species selected from the group consisting of persulfate, sulfate, peroxide, hydroperoxide, oxygen, and hydroxyl, and combinations.

14. The method of claim 1, wherein the polymer coating degrades over the duration of a remediation process.

15. A method of using polymer-coated nanoparticles to treat a soil comprising a contaminant, comprising:
    emulsifying the nanoparticles with an emulsifier selected from the group consisting of a surfactant, a cosolvent, and a mixture of a surfactant and a cosolvent, to form an emulsified treatment component;
    blending a plant product selected from the group consisting of a plant oil, a plant extract, and a combination of a plant oil and a plant extract, to form a blended treatment component; and
    introducing the emulsified treatment component and the blended treatment component into a subsurface of the soil or spreading the emulsified treatment component and the blended treatment component on the surface of the soil to create a reduction zone.

16. The method of claim 15, wherein the emulsified treatment component and the blended treatment component are simultaneously injected into the subsurface or simultaneously spread on the surface of the soil.

17. The method of claim 10, further comprising:
    obtaining non-coated nanoparticles;
    including in a permeable reactive barrier the non-coated nanoparticles;

including in the permeable reactive barrier the polymer-coated nanoparticles; and applying to the permeable reactive barrier a removing agent, thereby removing the polymer coating from the polymer-coated nanoparticles at the end of the useful life of the non-coated nanoparticles, thereby extending the useful life of the permeable reactive barrier.

* * * * *